(12) United States Patent
Kawamura et al.

(10) Patent No.: US 7,337,976 B2
(45) Date of Patent: Mar. 4, 2008

(54) SEMICONDUCTOR MEMORY

(75) Inventors: Hiromi Kawamura, Hiroshima (JP); Eiji Ueda, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 9 days.

(21) Appl. No.: 10/580,466

(22) PCT Filed: Mar. 31, 2005

(86) PCT No.: PCT/JP2005/006805

§ 371 (c)(1),
(2), (4) Date: May 25, 2006

(87) PCT Pub. No.: WO2005/098622

PCT Pub. Date: Oct. 20, 2005

(65) Prior Publication Data

US 2007/0090195 A1   Apr. 26, 2007

(30) Foreign Application Priority Data

Apr. 8, 2004   (JP) .............................. 2004-114330

(51) Int. Cl.
*G06K 19/06* (2006.01)
(52) U.S. Cl. ..................... 235/492; 235/375; 235/380; 235/382; 235/383
(58) Field of Classification Search ................ 235/492, 235/383, 380, 375, 382
See application file for complete search history.

(56) References Cited

U.S. PATENT DOCUMENTS

| | | | | |
|---|---|---|---|---|
| 5,055,661 A | * | 10/1991 | Gochi | ......................... 235/492 |
| 5,578,808 A | * | 11/1996 | Taylor | ......................... 235/380 |
| 5,813,009 A | * | 9/1998 | Johnson et al. | ............. 707/100 |
| 6,766,961 B2 | * | 7/2004 | Hosogoe et al. | ............. 235/492 |
| 6,957,256 B1 | * | 10/2005 | Bradley et al. | ............. 709/223 |
| 2004/0049513 A1 | * | 3/2004 | Yakir et al. | ................. 707/100 |

FOREIGN PATENT DOCUMENTS

| | | |
|---|---|---|
| GB | 2 356 469 | 5/2001 |
| WO | 98/52159 | 11/1998 |
| WO | 00/45262 | 8/2000 |

* cited by examiner

*Primary Examiner*—Michael G. Lee
*Assistant Examiner*—Tuyen Kim Vo
(74) *Attorney, Agent, or Firm*—Wenderoth, Lind & Ponack, L.L.P.

(57) ABSTRACT

The object of the present invention is to provide a semiconductor memory which executes executing multiple application programs and duplicating important data from one application program into another application program in security. An IC card (200) is one example of the semiconductor memory of the present invention, and executes executing multiple application programs. The IC card (200) includes: a memory area (331) for storing data relating to a library APL (301); a memory area (332) for storing data relating to a public pool APL (302); a security level setting unit (603) which identifies respective security levels of the library APL (301) and the public pool APL (302) for the data relating to these application programs, based on a criterion for identifying the security level of an application program for the data relating to it; and a data operation unit (608) which duplicates data A stored in the memory area (331) and stores the duplicated data A into the memory area (332), without taking the data A outside of the IC card (200), in the case where the relationship between the two security levels identified by the security level setting unit (603) meets a predetermined condition.

12 Claims, 20 Drawing Sheets

FIG. 8

Security level table (600)

| Level | Value | Encryption algorithm |
|---|---|---|
| Strong | 03h | Triple-DES |
| Medium | 02h | DES |
| Weak | 01h | AES |
| None | 00h | No encryption |

FIG. 9

Algorithm table (609)

| Number | Encryption algorithm |
|---|---|
| 0 | Triple-DES |
| 1 | DES |
| 2 | AES |
| 3 | No encryption |

FIG. 11

Library APL information:

| Application ID | 12h | 34h | 00h | 00h | 00h |
|---|---|---|---|---|---|
| Security level | 01h | 00h | | | |
| Encryption information | 80h | 02h | 00h | ... | 00h |
| Key information | 01h | 02h | 03h | | |
| Version information | 01h | 00h | 00h | ... | 00h |

Public pool APL information:

| Application ID | 56h | 78h | | | |
|---|---|---|---|---|---|
| Security level | 03h | 00h | | | |
| Encryption information | C0h | 00h | 00h | ... | 00h |
| Key information | FFh | FEh | FDh | | |
| Version information | 05h | 00h | 00h | ... | 00h |

...

Electronic money APL information:

| Application ID | FEh | FFh | | | |
|---|---|---|---|---|---|
| Security level | 03h | 00h | | | |
| Encryption information | C0h | 00h | 00h | ... | 00h |
| Key information | 11h | 22h | 33h | | |
| Version information | 1Ah | 00h | 00h | ... | 00h |

FIG. 21

| CLA | INS | P1 | P2 | Lc | Data | Le |

←——Mandatory header——→←——Conditional body——→

FIG. 22

| Command name | SELECT | READ RECORD | INTERNAL AUTHENTICATE |
|---|---|---|---|
| CLA(1byte) | 00h | 00h | 00h |
| INS(1byte) | A4h | B2 | 88h |
| P1(1byte) | XXh | Record Number | 00h |
| P2(1byte) | 00h | XXh | 00h |

FIG. 23

| b8 | b7 | b6 | b5 | b4 | b3 | b2 | b1 | Meaning |
|---|---|---|---|---|---|---|---|---|
| 0 | 0 | 0 | 0 | 0 | 0 | 0 | 0 | Select MF, DF and EF |
| 0 | 0 | 0 | 0 | 0 | 0 | 0 | 1 | Select child DF |
| 0 | 0 | 0 | 0 | 0 | 0 | 1 | 0 | Select EF under current DF |
| 0 | 0 | 0 | 0 | 0 | 0 | 1 | 1 | Select parent DF of current DF |
| 0 | 0 | 0 | 0 | 0 | 1 | 0 | 0 | Direct selection by DF name |
| 0 | 0 | 0 | 0 | 1 | 0 | 0 | 0 | Select from MF |
| 0 | 0 | 0 | 0 | 1 | 0 | 0 | 1 | Select from current DF |
| | | | | | | | | Any other value: Not specified |

| b8 | b7 | b6 | b5 | b4 | b3 | b2 | b1 | Meaning |
|----|----|----|----|----|----|----|----|---------|
| 0 | 0 | 0 | 0 | | | | | Common command |
| 1 | 0 | 0 | 0 | | | | | Unique command |

SEMICONDUCTOR MEMORY

TECHNICAL FIELD

The present invention relates to a semiconductor memory which is capable of executing multiple application programs.

BACKGROUND ART

Semiconductor memories have recently attracted attention from a wide variety of business fields such as mass media, financial institutions and local governments. Stored-data protection function of the semiconductor memories is one of the reasons they are so attractive. Semiconductor memories having stored-data protection function are, for example, secure digital (SD) memory cards, integrated circuit (IC) cards and the like.

FIG. 1 is a diagram showing an overview of an internal structure of a commonly-used IC card. As shown in FIG. 1, an IC card 200 includes: a ROM 203 for storing application programs; a RAM 202 for temporarily storing data used for executing an application program; a CPU 201 for performing control processing such as various command processing according to the application programs stored in the ROM 203; and a rewritable EEPROM 204 for storing application programs downloaded from outside.

IC cards have now replaced most of magnetic cards used as credit cards and for other purposes. IC cards have advantageous characteristics over magnetic cards, including larger storage capacity and enhanced security function for stored information such as personal information.

An old-type IC card was capable of executing only one application program such as electronic money. However, with the increase in storage capacity and CPU processing speed, it has become possible to consolidate multiple application programs onto one IC card and execute them. Such a multi-application IC card enables the user (card holder) to use a variety of application programs with only one card.

The IC cards of this type which are capable of storing multiple application programs and executing them are hereinafter referred to as "multi-application IC cards." In the following description, the cards of this type are also referred to as just as "IC cards".

FIG. 2 is a diagram showing a software structure of a conventional IC card. The IC card as software has a layer structure including: a memory area 310 which is used by multiple application programs, on the bottom layer; an operating system (OS) 311 on the memory area 310; and the multiple application programs on the top layer.

As shown in FIG. 2, an IC card 200 stores multiple application programs including a first client EC application program (first C_E_APL) 301, a second client EC application program (second C_E_APL) 302 and a client public application program (C_P_APL) 303.

In the case where multiple application programs are stored on a single IC card as mentioned above, the firewall function of the OS 311 prevents each application program from invading an area of the memory area 310 to be used by another application program. In other words, each application program has its own memory area in the memory area 310 for storing data relating to itself. In a conventional IC card, multiple application programs are stored independently of each other, and there is no means for allowing interaction between them.

Therefore, for example, in order to duplicate personal information stored in one area of the memory area 310 for an electronic money application program into another area of the memory area 310 for another application program, the data is duplicated via a server using its own application program other than the IC card.

Note that "APL" in the diagrams and description denotes "an application program" and "data of an application program" denotes "data relating to an application program" which is stored in a memory area exclusively for the application program. In addition, "duplicating data into an application program" denotes "duplicating data and storing the duplicated data into a memory area exclusively for the application program".

FIG. 3 is a conceptual diagram showing how data is duplicated from one application program into another application program in a conventional IC card. Note that the IC card 200 and the EC server 100 communicate with each other via a reader/writer 121.

FIG. 3 shows the IC card 200 in which data A stored in the memory area of the first C_E_APL 321 is duplicated into the memory area of the second C_E_APL 322.

FIG. 3 also shows the case where the EC server 100 for providing electronic commerce services is used for such duplication of the data A.

As shown in FIG. 3, since there is the firewall 340 between the first C_E_APL 321 and the second C_E_APL 322, the data A cannot be duplicated inside the IC card 200. Therefore, the data A is duplicated via the EC server 100. The user of the EC server 100 determines whether to duplicate data or not and selects data to be duplicated.

First, the user selects data to be duplicated and requests the EC server 100 to execute the duplication. Upon receipt of the user's selection and request, the control APL 109 in the EC server 100 authenticates the reading APL 107 and the first C_E_APL 321 in the IC card 200, and further authenticates the writing APL 108 and the second C_E_APL 322.

After the authentication, the control APL 109 requests the reading APL 107 to read out the data. The reading APL 107 reads out the data A of the first C_E_APL 321 in the IC card 200 via the reader/writer 121. Next, the control APL 109 requests the writing APL 108 to write the data A. The writing APL 108 writes the data A into the memory area for the second C_E_APL 322 in the IC card 200 via the reader/writer 121.

DISCLOSURE OF INVENTION

As described above, in the conventional art, when data is duplicated from one application program to another application program, the data to be duplicated in an IC card is once taken outside the card because the OS of the IC card protects, using a firewall, the memory area of each application program from being invaded.

In other words, in the above conventional art, the application program of the external server once reads out, from the card, the data and the encryption information of the data stored in the card, and then writes them into another memory area in the card. Therefore, the encryption information is at risk of being leaked outside. Furthermore, not only such encryption information but also important data such as electronic money may be in danger of being leaked outside and tampered by unauthorized third parties. This is the problem of the conventional art.

The present invention has been conceived in order to solve this problem, and an object of the present invention is to provide a semiconductor memory which is capable of executing multiple applications and duplicating important data from one application program to another in security.

In order to achieve the above object, the semiconductor memory of the present invention is a semiconductor memory which is capable of executing at least two application programs, including: a first storage unit operable to store data relating to a first application program; a second storage unit operable to store data relating to a second application program; a level identification unit operable to identify respective security levels of the first and second application programs for the data relating to the first and second application programs, based on a criterion for Identifying a security level of an application program for data relating to the application program; and a duplication unit operable to duplicate the data stored in the first storage unit and to store the duplicated data into the second storage unit, without taking the data outside of the semiconductor memory, in the case where a relationship between the two security levels identified by the level identification unit meets a predetermined condition.

It is possible that the semiconductor memory according to the present invention further includes a comparison unit operable to determine the relationship by comparing the two security levels identified by the level identification unit, and the duplication unit is operable to duplicate the data stored in the first storage unit and to store the duplicated data into the second storage unit, in the case where the relationship determined by the comparison unit meets the predetermined condition.

It is also possible that the semiconductor memory according the present invention further includes an obtaining unit operable to obtain the relationship determined by comparing the two security levels identified by the level identification unit, and the duplication unit is operable to duplicate the data stored in the first storage unit and to store the duplicated data into the second storage unit, in the case where the relationship obtained by the obtaining unit meets the predetermined condition.

The security level may be a value corresponding to a strength of encryption used by each of the application programs.

The strength of the encryption may be stronger as an algorithm of the encryption is more complex, or it may be stronger as a bit length of a key for the encryption is longer.

The security level may be a value corresponding to a version number of an application protocol used by each of the application programs.

Or, the security level may a value corresponding to a version number of each of the application programs.

As described above, the semiconductor memory of the present invention includes the level identification unit, which determines the security levels of the two application programs for the data relating to them based on the criterion for identifying the security level of an application program for the data relating to it. In other words, these two security levels are identified based on the criterion common to all the application programs, so they can be compared with each other.

In the case where the relationship between these two security levels meets a predetermined condition, the duplication unit duplicates the data relating to the first application program stored in the first storage unit and stores the duplicated data into the second storage unit which stores the data relating to the second application program. In other words, the data is duplicated within the semiconductor memory. Therefore, it becomes possible to duplicate the data from one application program to another in security.

In the case where the application program as a duplication destination has the security function of the strength equal to or stronger than that of the application program as a duplication source, the data relating to the duplication source is the data which should be protected in security equal to or stronger than that in the current situation. In other words, the data is deemed to be so important.

In this case, duplication of such important data within the semiconductor memory allows protection of the important data from leakage outside or tampering by unauthorized third parties. As a result, the user can make use of the semiconductor memory with a sense of security.

The semiconductor memory of the present invention determines the relationship of the two security levels by comparing them. Therefore, the security levels are also not leaked from the semiconductor memory, so there is no danger that the security levels are known to third parties.

The semiconductor memory of the present invention obtains the relationship between the two security levels determined by comparing them. Therefore, the semiconductor memory does not need to include a constituent element for comparing the security levels, which gives a simpler structure.

The semiconductor memory of the present invention uses, as a security level, a value corresponding to the strength of encryption of each application program. The strength of the encryption is stronger as the algorithm of the encryption is more complex, or as the bit length of the encryption key is longer. Therefore, it becomes possible to determine the value of the security level so high as to make it difficult for third parties to decrypt the data.

The semiconductor memory of the present invention uses, as a security level, a value corresponding to the version number of the application protocol used by each application program. Therefore, it becomes possible to determine the value of the security level higher as the security function of the application protocol is improved and the version of the application protocol is enhanced.

The semiconductor memory of the present invention uses, as a security level, a value corresponding to the version number of each application program. Therefore, it becomes possible to determine the value of the security level higher as the security function of the application program is improved and the version of the application program is enhanced.

As described above, the strength of encryption, the version of the protocol and the like can be used as the information for identifying the security level, so it becomes possible to identify the security level according to the current conditions in which the semiconductor memory of the present invention is used.

In sum, the present invention provides a semiconductor memory which is capable of executing multiple application programs and duplicating important data from one application program to another in security.

Note that the present invention can also be embodied as a method including, as steps, the characteristic units included in the semiconductor memory of the present invention, as a program causing a computer to execute those steps, as a storage medium such as a CD-ROM on which the program is stored, or as an integrated circuit. It is needless to say that the program can be distributed via a transmission medium such as a communication network.

As further information about technical background to this application, the disclosure of Japanese Patent Application No. 2004-114330 filed on Apr. 8, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate specific embodiments of the invention. In the Drawings:

FIG. 8 is a diagram showing one example of a data structure of a security level table stored in a security information storage unit;

FIG. 9 is a diagram showing one example of a data structure of an algorithm table stored in the security information storage unit;

FIG. 11 is a diagram showing one example of attribute information stored in the APL information table;

FIG. 21 is a diagram showing a data structure of a command APDU;

FIG. 22 is a diagram showing an example of commands which are defined in ISO7816 that is the international standard for contact-type IC cards;

FIG. 23 is a diagram showing contents of a control parameter P1 in a SELECT command;

BEST MODE FOR CARRYING OUT THE INVENTION

A description is given below of the best mode for carrying out the present invention, with reference to the diagrams. An IC card described in the first to third embodiments of the present invention is one example of the semiconductor memory of the present invention, which is a contact IC card and includes a tamper-resistant module (TRM). Note that it is also possible to embody the semiconductor memory of the present invention as a contactless IC card.

Note that as for the semiconductor memory of the present invention, "duplication of data" in the following description includes "transfer of data" in which original data is deleted after duplication of the data.

First Embodiment

First, a description is given of an environment in which the IC card of the embodiments of the present invention is used.

Figure 4:
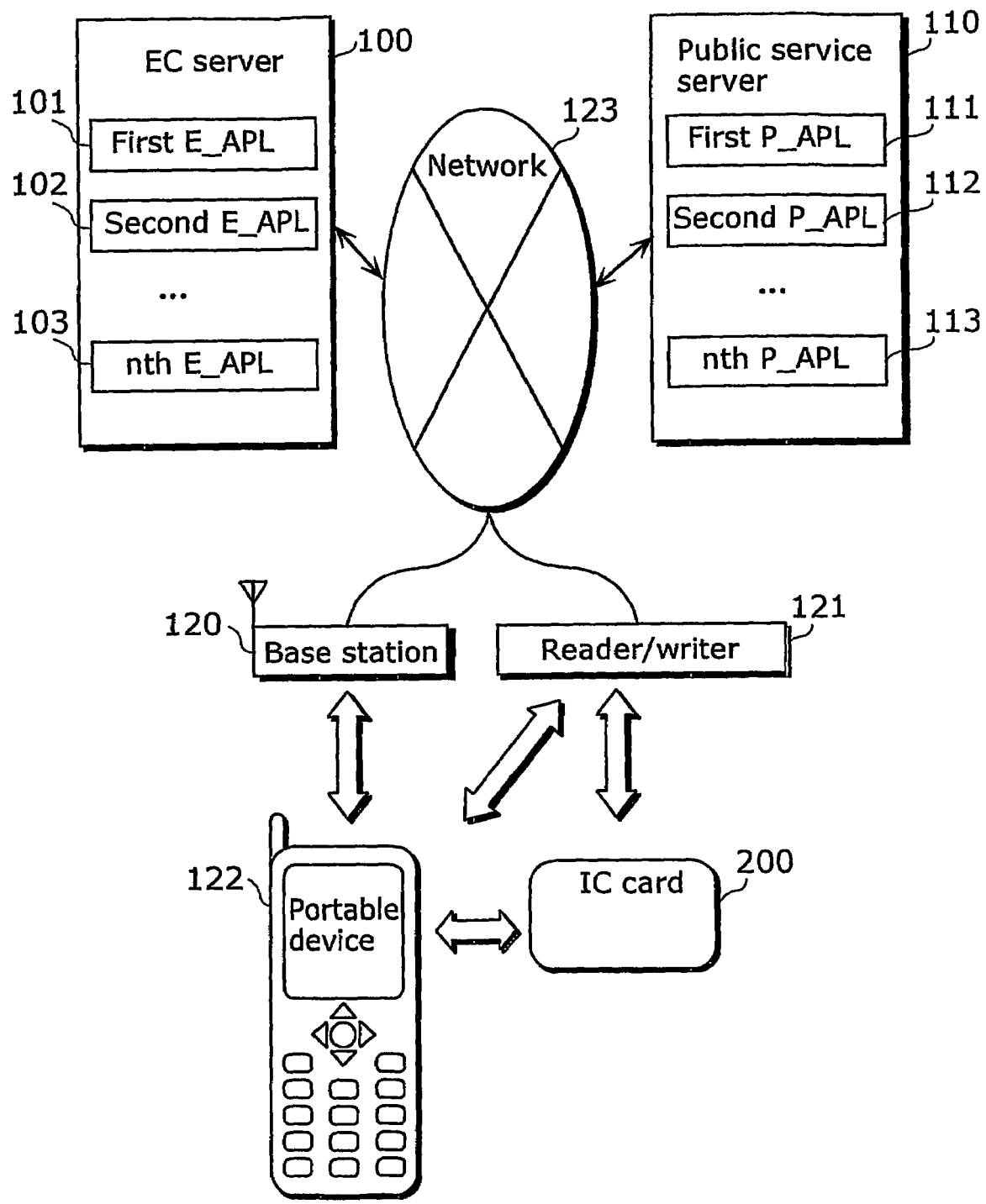
FIG. 4 is a diagram showing an environment in which an IC card is used.

FIG. 4 is a diagram showing the environment in which the IC card is used. As shown in FIG. 4, the environment in which the IC card 200 is used includes an EC server 100, a public service server 110, a wireless base station 120, a reader/writer 121, a portable device 122 and a network 123.

The EC server 100 is a server for providing electronic commerce services (hereinafter referred to as "EC services") such as online payment. On the EC server 100, n types of server application programs, namely, a first E_APL 101, a second E_APL 102, . . . , an nth E_APL 103, operate respectively for n types of services. Each server application program provides the IC card 200 of its own EC service.

The public service server 110 is a server for providing public services such as applications for use of public facilities. On the public service server 110, n types of application programs, namely, a first P_APL 111, a second P_APL 112, . . . , an nth P_APL 113, operate respectively for n types of services. Each server application program provides the IC card 200 of its own public service.

The reader/writer 121 is an apparatus for reading data from the IC card 200 or writing data into the IC card 200. For example, this reader/writer 121 is embodied as a cash dispenser in a credit card company. The reader/writer 121 is connected to the network 123, which makes it possible for the IC card 200 to use server application programs stored in the EC server 100 and the public service server 110 via the reader/writer 121.

The wireless base station 120 is a device installed on the roof of a building or the top of a utility pole so as to exchange data with a portable device 122 by radio waves. The wireless base station 120 is connected to the network 123, which makes it possible for the portable device 122 to communicate with the EC server 100 and the public service server 110 via the wireless base station 120.

The portable device 122 in a mobile phone type device which is capable of communicating with the IC card 200, and has a card slot for inserting the IC card 200, which means that it is possible for the IC card 200 to use server application programs of the EC server 100 and the public service server 110 not only via the reader/writer 121 but also via the portable device 122.

Since browser software is installed on the portable device 122, the user can access the data in the IC card 200 via the user interface of this browser software.

Note that the operations of the IC card 200, the EC server 100 and the public service server 110 are unchanged when the IC card 200 communicates with the EC server 100 or the public service server 110 either via the reader/writer 121 or via the portable device 122.

Figure 5:
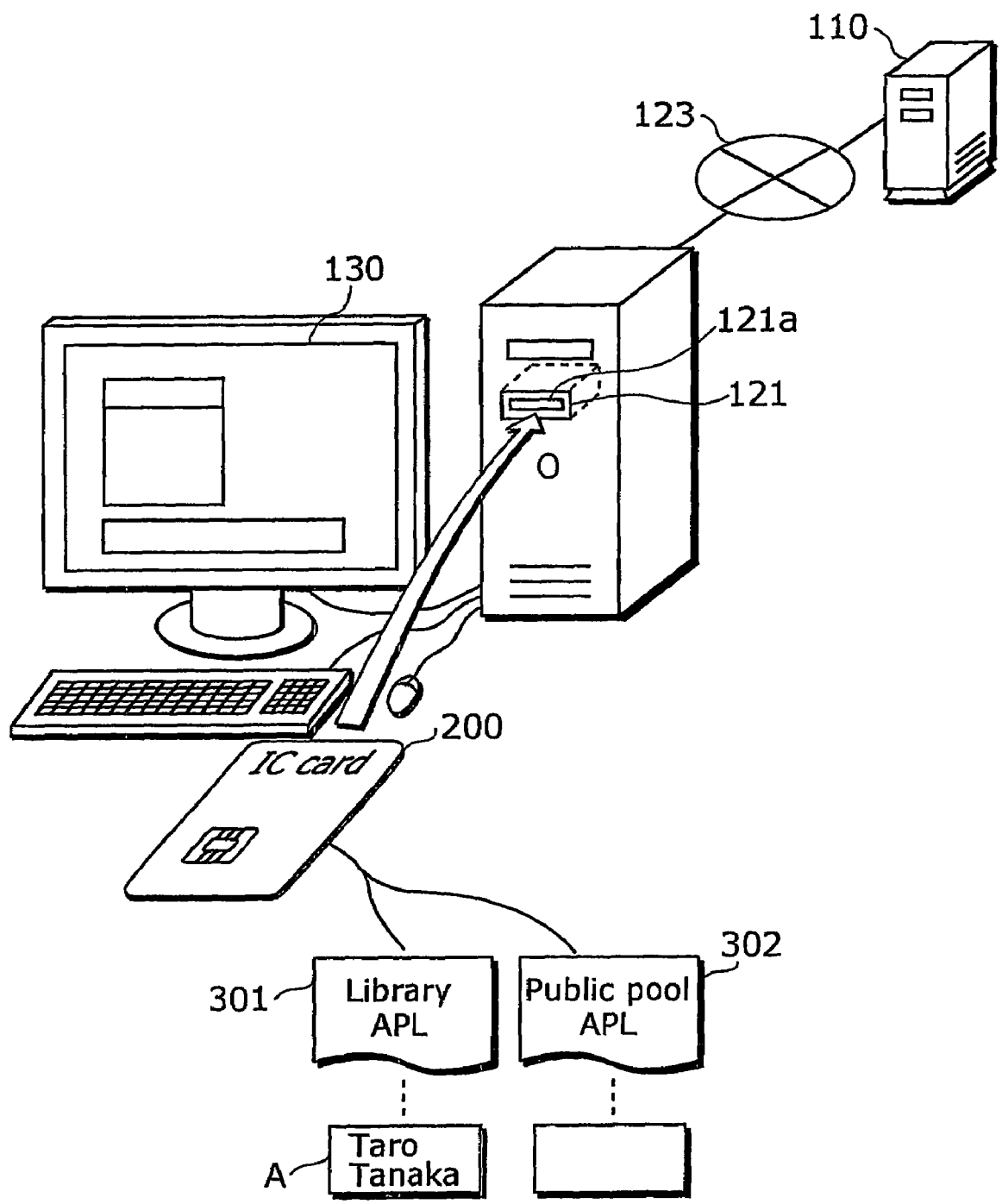
FIG. 5 is a diagram showing an overview of a hardware configuration in which an IC card in a first embodiment communicates with a public service server under the environment shown in FIG. 4.

FIG. 5 is a diagram showing an overview of a hardware configuration in which the IC card 200 communicates with the public service server 110 under the environment shown in FIG. 4.

As shown in FIG. 5, the IC card 200 stores a library APL 301 and a public pool APL 302 which are the application programs for use of the public service server 110.

These application programs are downloaded from the public service server 110 and stored in the IC card 200.

The library APL 301 is an application program for borrowing books from a library, and is capable of checking the records of a user's borrowing books through the communication with the public service server 110. The user's personal data A such as his name is stored in a memory area exclusively for the library APL 301.

The public pool APL 302 is an application program for entering a facility having a public swimming pool in itself, and is capable of checking the records of the user's entries into the facility through the communication with the public service server 110. Since the public pool APL 302 has just been downloaded, the user's personal data has not yet been stored in a memory area exclusively for the public pool APL 302.

When the user inserts the IC card 200 into the card slot 121a on the reader/writer 121 mounted on a personal computer (hereinafter referred to as a "PC"), it becomes possible to establish communication between the IC card 200 and the public service server 110.

The user can view, on the display monitor 130 connected to the PC, the information delivered from the public service server 110 and the data stored in the IC card 200. The user can also give an instruction to the public service server 110 and the IC card 200 by operating a keyboard or a mouse equipped to the PC.

Figure 6:
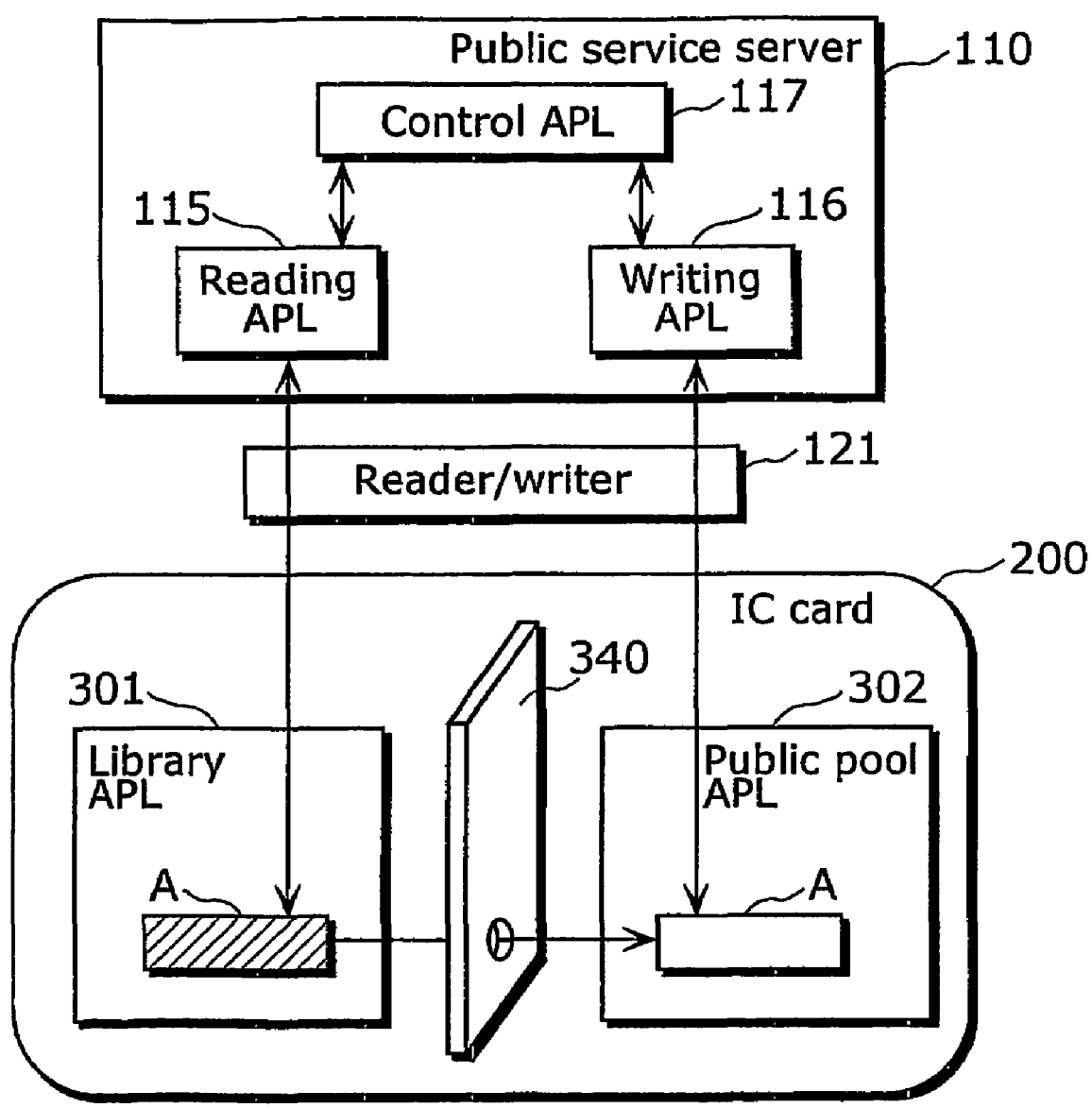
FIG. 6 is a conceptual diagram showing how data of a library APL is duplicated as data of a public pool APL.

FIG. 6 is a conceptual diagram showing how the data A for the library APL 301 is duplicated as data of the public pool APL 302. A brief outline is given, with reference to FIG. 6, of how the data in the IC card 200 of the first embodiment is duplicated. The IC card 200 in the first embodiment of the present invention holds the security level of each application program stored in the IC card 200. A security level denotes security strength of each application program for the data relating to the application program itself. The security level of each application program is identified based on the same criterion. The public service server 110 has a function of comparing the security levels. Security levels are described later with reference to FIG. 8.

When the security level of the public pool APL 302 as a duplication destination is equal to or higher than the security level of the library APL 301 as a duplication source as a result of the comparison of their security levels by the public service server 110, the OS of the IC card 200 temporarily or partially disables the firewall 340 between these application programs. As a result, the data A is duplicated within the IC card 200, as shown in FIG. 6.

If the security strength of an application program as a duplication destination is equal to or stronger than the security strength of an application program as a duplication source when data is duplicated, it means that the data should be protected more securely than ever at the duplication destination which needs that data. In other words, the data is considered to be important.

Therefore, the data A is duplicated inside the IC card 200 without being taken outside of the IC card 200. In other words, the data is duplicated without being read outside of the IC card 200, that is, not through an external device connected to the IC card 200. As a result, it becomes possible to duplicate the important data A while ensuring the security of that data.

Note that in the case where the security strength of the public pool APL 302 as the duplication destination of the data A is weaker than the security strength of the library APL 301 as the destination source, the firewall 340 is not disabled temporarily or partially and the data A is duplicated via the public service server 110. To be more specific, upon receiving a request from the control APL 117 included in the public service server 110, the reading APL 115 reads out the data A via the reader/writer 121. The readout data A is written, via the reader/writer 121, into a memory area exclusively for the public pool APL 302 in the IC card 200 by the operation of the writing APL 116.

The operations of the IC card 200 and the public service server 110 during the above-mentioned duplication of data are described in detail later with reference to FIGS. 12 to 15.

Next, a description is given of the structures of the IC card 200 and the public service server 110 in the first embodiment, with reference to FIGS. 7 to 11. Note that the hardware structure of the IC card 200 is same as the hardware structure of a commonly-used IC card (See FIG. 1).

Figure 7:
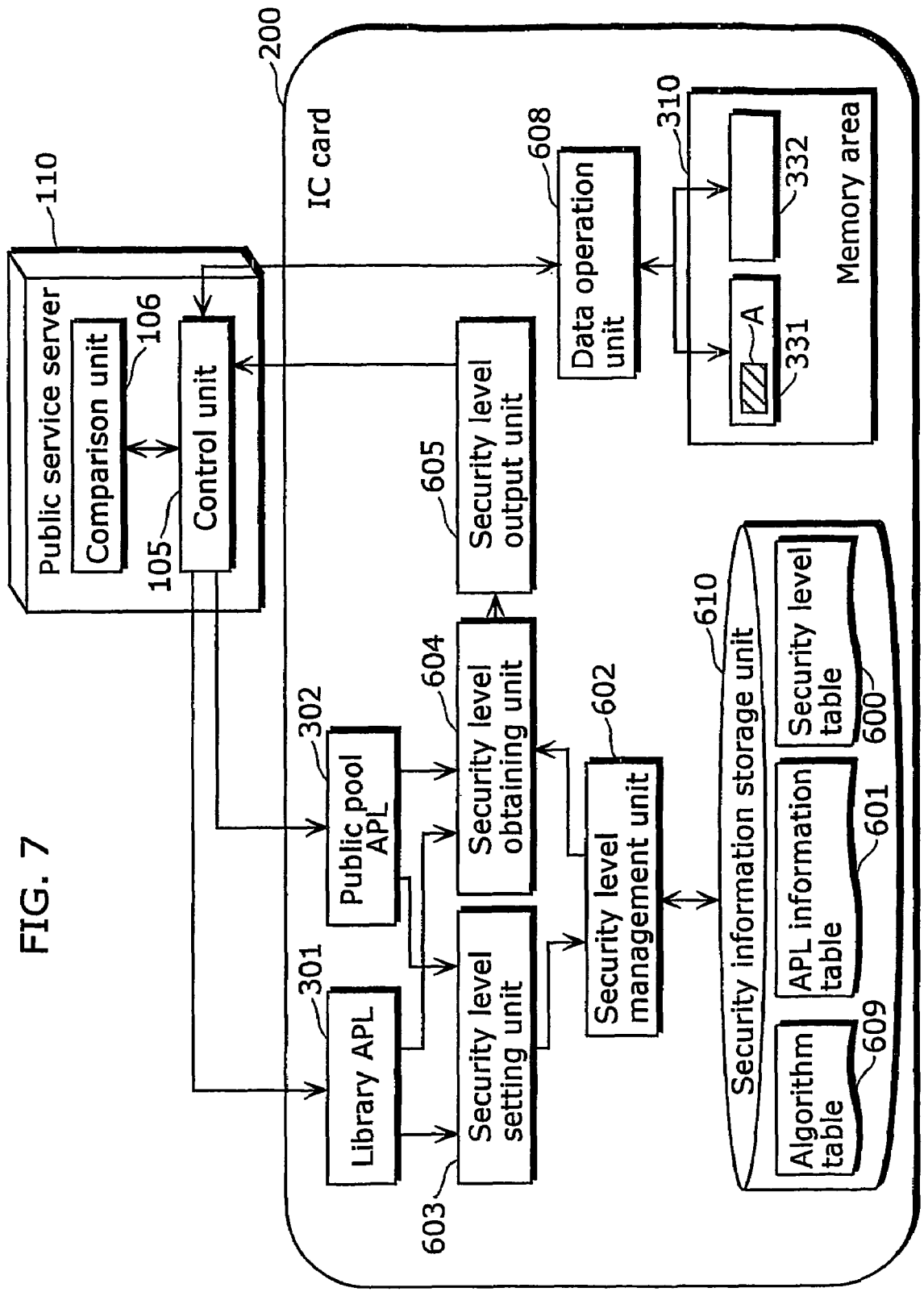
FIG. 7 is a functional block diagram showing functional software structures of the IC card and the public service server in the first embodiment.

FIG. 7 is a functional block diagram showing functional software structures of the IC card 200 and the public service server 110 in the first embodiment.

As shown in FIG. 7, the IC card 200 includes a library APL 301, a public pool APL 302, a security level setting unit 603, a security level obtaining unit 604, a security level output unit 605, a security level management unit 602, a security information storage unit 610, a data operation unit 608 and a memory area 310.

Note that the reader/writer 121 which relays communication between the IC card 200 and the public service server 110, the operating systems which are inherently contained in the IC card 200 and the public service server 110 and the like are not shown in the diagrams nor described here, and only the characteristic elements in the data duplication in the first embodiment are described below.

As mentioned above, the library APL 301 is an application program for borrowing books in a library, and is capable of checking the records of the user's borrowing books through the communication with the public service server 110.

As mentioned above, the public pool APL 302 is an application program for entering a facility having a public swimming pool in itself, and is capable of checking the records of the user's entries into the facility through the communication with the public service server 110.

The security level setting unit 603 is a processing unit for identifying the security level of a downloaded application program, as well as one example of the level identification unit in the semiconductor memory of the present invention. The security level obtaining unit 604 is a processing unit for obtaining the security level stored in the APL information table 601 in the security information storage unit 610. The security level output unit 605 is a processing unit for outputting the security level obtained by the security level obtaining unit 603 to the public service server 110.

The security information storage unit 610 is a storage area in which the security level table 600, the algorithm table 609 and the APL information table 601 are stored.

The security level table 600 is a table for identifying the security level of each application program based on the encryption algorithm used by that application program. The algorithm table 609 is a table for identifying the encryption algorithm used in each application program. The APL information table 601 is a table in which attribute information of each application program is stored. The contents of each table are described later with reference to FIGS. 8 to 11.

The security level management unit 602 is a processing unit for inputting and outputting information stored in the security information storage unit 610.

The memory area 310 is a storage area for storing data relating to each application program. It includes a memory area 331 exclusively for the library APL 301 and a memory area 332 exclusively for the public pool APL 302. The memory area 331 is one example of the first storage unit in the semiconductor memory of the present invention, while the memory area 332 is one example of the second storage unit in the semiconductor memory of the present invention. The data A is stored in the memory area 331.

The data operation unit 608 is a processing unit for duplicating data stored in the memory area 310, as well as one example of the duplication unit in the semiconductor memory of the present invention.

As mentioned above, the public service server 110 is a server for providing public services such as applications for use of public facilities, and includes the control unit 105 and the comparison unit 106.

The control unit 105 is a processing unit for exchanging data with the IC card 200 and controlling the comparison unit 106. More specifically, the control unit 105 is a processing unit for fulfilling the functions of the reading APL 115 and the writing APL 116 which are server application programs for reading and writing data as shown in FIG. 6, and the control APL 117. The comparison unit 106 is a processing unit for comparing two security levels transmitted from the IC card 200 so as to determine the relationship between them. For example, the comparison unit 106 determines the relationship between the security levels of the public pool APL 302 and the library APL 301 that the security level of the former is higher than the security level of the latter.

As described above, the IC card 200 in the first embodiment of the present invention includes the security level table 600 in order to identify the security level of each application program. This security level table 600 is applied commonly to two or more application programs. In other words, since the security levels of these application programs are identified based on the common criterion, the security levels of the application programs can be compared with each other.

FIG. 8 is a diagram showing one example of a data structure of the security level table 600 stored in the security information storage unit 610.

In the security level table 600, the encryption algorithm used for each application program and the value indicating the strength of the encryption algorithm are shown in association with each other.

As shown in FIG. 8, if the encryption algorithm is Triple Data Encryption Standard (Triple-DES), the security level is "strong" and the value is "03h". If the encryption algorithm is DES, the security level is "medium" and the value is "02h". If the encryption algorithm is Advanced Encryption Standard (AES), the security level is "weak" and the value is "01h". Furthermore, if the data is not encrypted, the security level is "None" and the value is "00h".

FIG. 9 is a diagram showing one example of a data structure of the algorithm table 609 stored in the security information storage unit 610.

In the algorithm table 609, the encryption algorithm used for each application program and the number indicating the encryption algorithm (hereinafter referred to as an "algorithm number") are defined.

For example, as shown in FIG. 9, if the algorithm number is 0, the encryption algorithm is determined to be Triple-DES.

Figure 10:
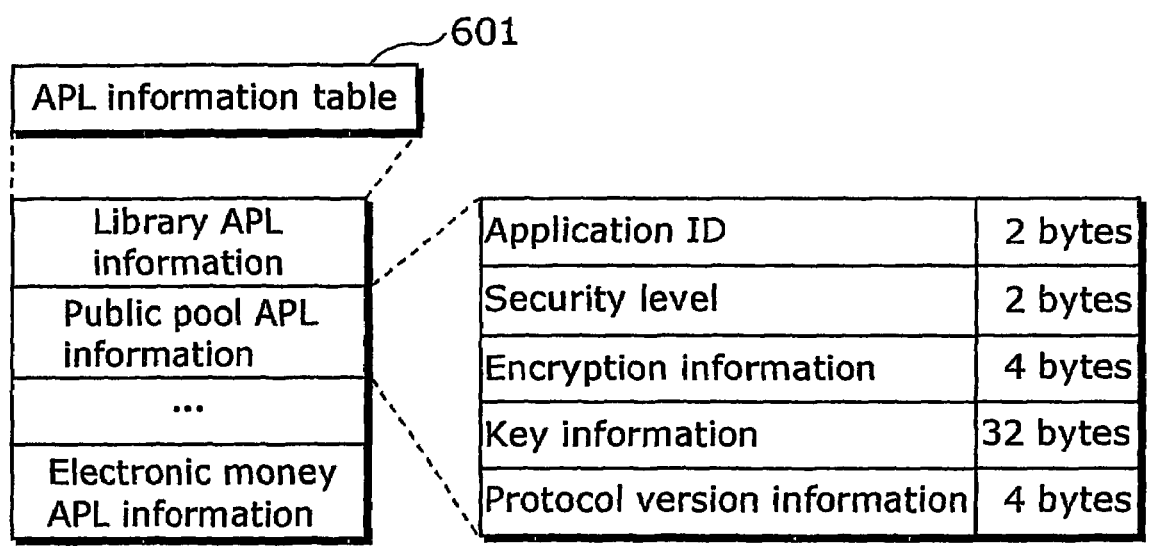
FIG. 10 is a diagram showing one example of a data structure of an APL information table stored in the security information storage unit.

FIG. 10 is a diagram showing one example of a data structure of the APL information table 601 stored in the security information storage unit 610. The APL information table 601 is a table in which the attribute information of each application program, such as the library APL 301, is stored. Note that "Electronic money APL information" in the APL information table 601 is the attribute information of an electronic money APL which is not shown in FIGS. 5 to 7. The electronic money APL is an application program for the user to use electronic money.

As shown in FIG. 10, the attribute information of each application program in the APL information table 601 includes the following items: an application ID for identifying an application program; a security level that is a value defined in the security level table 600; encryption information including a bit length of an encryption key and a value indicating an encryption algorithm; key information that is encryption key data itself; and application protocol information that is a version of an application protocol (hereinafter referred to as a "protocol version"). The data length of each attribute information is also defined in this table, and for example, the data length of the application ID is 2 bytes.

FIG. 11 is a diagram showing one example of the attribute information stored in the APL information table 601.

As shown in FIG. 11, the APL information table 601 stores the attribute information of each application program. For example, as for the library APL 301, the application ID is 3412h and the security level is 01h ("weak"). This security level is identified and assigned by the security level setting unit 603 at the time when each application program is downloaded.

More specifically, when each application program is downloaded to the IC card 200, the security level setting unit 603 extracts the attribute information of each application program. The extracted attribute information is transmitted to the security level management unit 602.

The security level management unit 602 writes all the attribute information but the security level into the APL information table 601. It also identifies the encryption algorithm based on the algorithm number included in the attribute information and the above-mentioned algorithm table 609.

The security level setting unit 603 identifies the value indicating the security level based on the encryption algorithm identified by the security level management unit 602 and the above-mentioned security level table 600. The security level management unit 602 writes the identified value into the APL information table 601.

In sum, the security level of each downloaded application program is identified based on the security level table 600 that is the criteria common to all the application programs.

Note that the field of the encryption information represents, from the left, the bit length of the encryption key and the algorithm number. For example, as for the library APL 301, the bit length of the encryption key is 80h and the algorithm number is 02h, which means that the bit length of the encryption key, is 128 bits (16 bytes) and the algorithm number is 2.

The encryption algorithm corresponding to the algorithm number 2 is AES (See FIG. 9), and the value corresponding to AES is 01h (See FIG. 8). Therefore, the security level of the library APL 301 is 01h ("weak").

This table also shows that the field of the key information stores the encryption key of 128 bits (16 bytes), and the protocol version is 01h.

Similarly, as for the public pool APL 302, the application ID is 7856h and the security level is 03h ("strong"). The bit length of the encryption key is C0h and the algorithm number is 00h, which means that the bit length of the encryption key is 192 bits (24 bytes) and the algorithm number is 0. This table also shows that the field of the key information stores the encryption key of 192 bits (24 bytes), and the protocol version is 05h.

As described above, the security level of the library APL 301 is 01h ("weak"), while the security level of the public pool APL 302 is 03h ("strong"). In other words, it is clear that the security level of the public pool APL 302 is higher than that of the library APL 301, and therefore has a stronger security function than that of the library APL 301.

Next, a description is given of the data duplication operations of the IC card 200 and the public service server 110, with reference to FIGS. 12 to 15.

Figure 12:
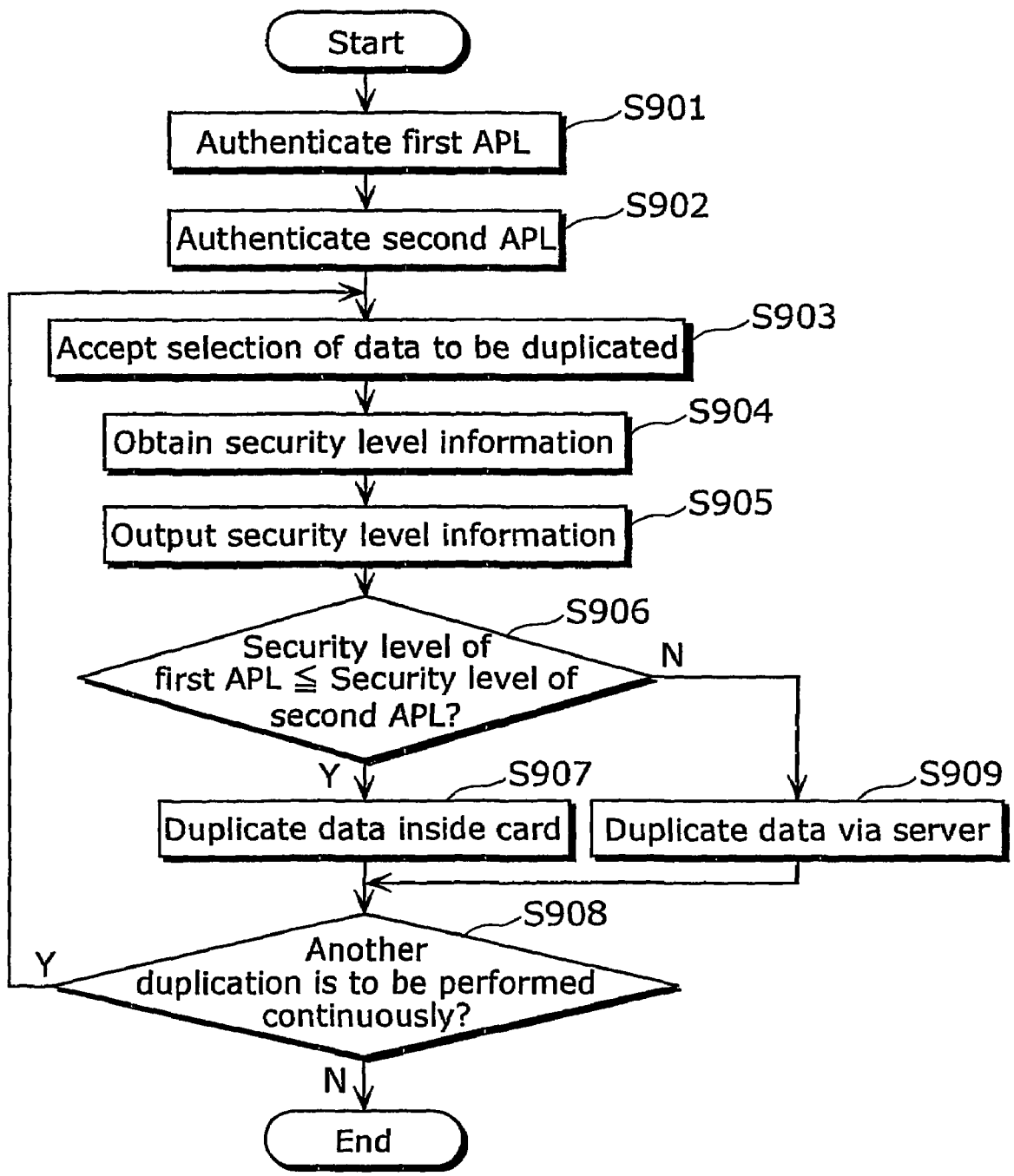
FIG. 12 is a flowchart showing a flow of data duplication operations of the IC card and the public service server in the first embodiment.

FIG. 12 is a flowchart showing a flow of data duplication operations of the IC card 200 and the public service server 110 in the first embodiment.

Note that the following description is made on the assumption that the data A stored in the memory area 331 exclusively for the library APL 301 is duplicated into the memory area 332 exclusively for the public pool APL 302. It is also assumed that the user uses the IC card 200 in the hardware configuration as shown in FIG. 5.

The data is sent and received between the IC card 200 and the public service server 110 using a predetermined protocol.

First, the user inserts the IC card 200 into the card slot 121a of the reader/writer 121 and does a predetermined action on the PC equipped with the reader/writer 121. According to this action, the control unit 105 of the public service server 110 authenticates the library APL 301 that is the first application program having the data A (S901). After the authentication, a screen shown in FIG. 13 is displayed on the display panel 130 connected to the PC.

Figure 13:
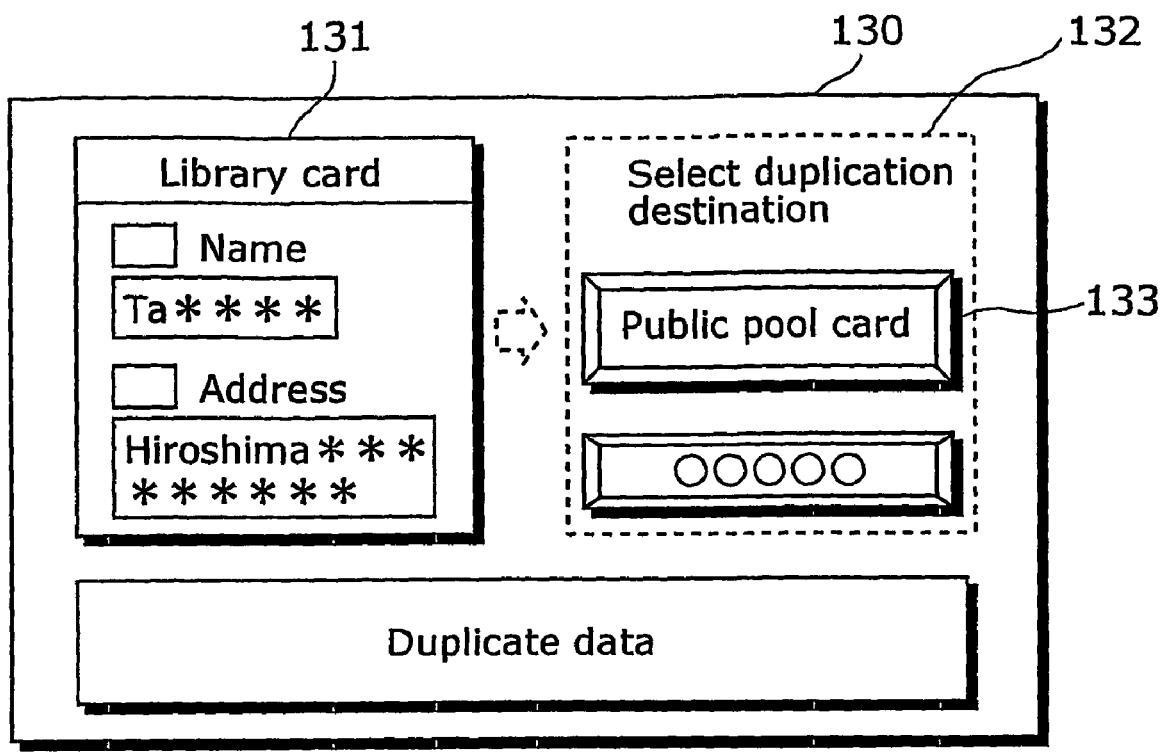
FIG. 13 is a diagram showing one example of a duplication destination selection screen for a user to select an application program to which data is to be duplicated.

FIG. 13 is a diagram showing one example of a duplication destination selection screen for the user to select an application program to which data is to be duplicated. As shown in FIG. 13, a duplication source data display field 131 and a duplication destination data display field 132 are displayed on the duplication destination selection screen. Note that the screen displayed on the display panel 130 is generated by the control unit 105, and the data displayed thereon is outputted from the IC card 200.

In the duplication source data display field 131, the name and address which are the data relating to the library APL 301 are displayed under the title of "Library card" in the form in which a part of the data is kept out of view. In the duplication destination data display field 132, the selection button 133 for selecting the application program as the duplication destination is displayed.

When the user clicks the selection button 133 indicating "Public pool card", the control unit 105 of the public service server 110 authenticates the public pool APL 302 that is the second application program as the data duplication destination (S902).

Figure 14:
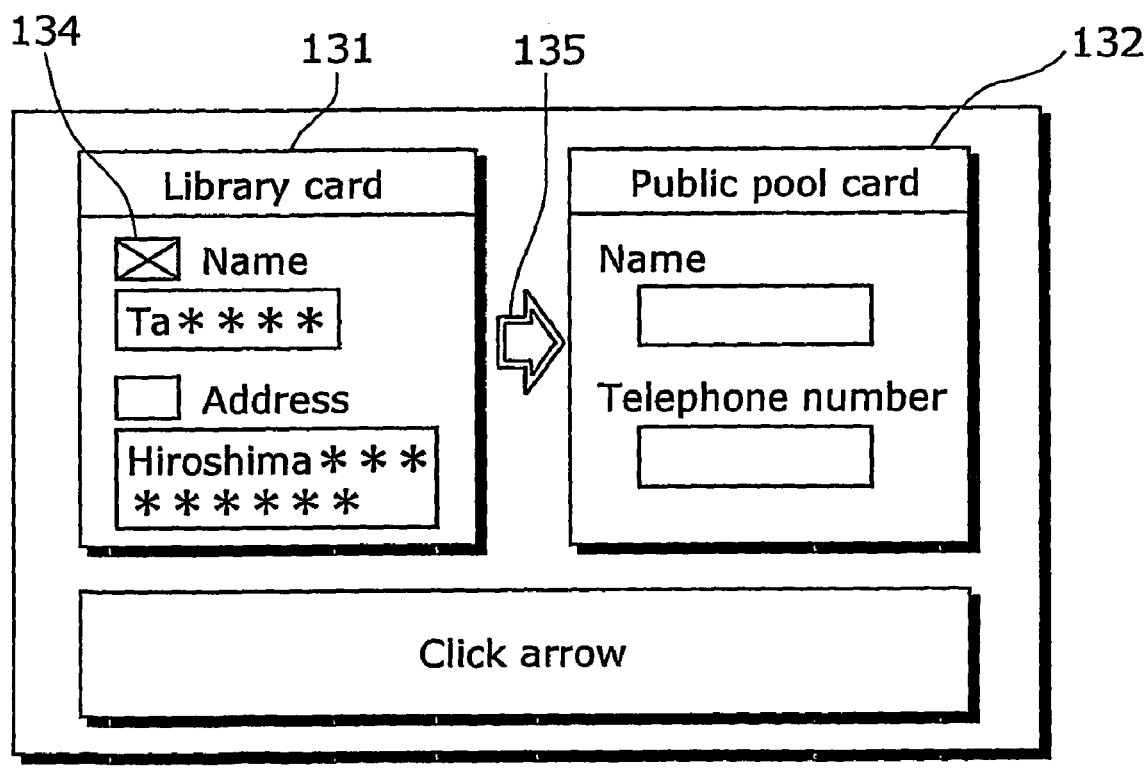
FIG. 14 is a diagram showing one example of a duplication data selection screen for a user to select data to be duplicated.

After the authentication of the public pool APL 302, a screen shown in FIG. 14 is displayed on the display panel 130.

FIG. 14 is a diagram showing one example of the duplication data selection screen for the user to select data to be duplicated.

FIG. 14 shows the state in which the user has marked the check box 134 for the name in the duplication source data display field 131. An arrow button 135 is displayed in the center of the screen.

As shown in FIG. 14, when the arrow button 135 is clicked in the state in which the check box 134 has been marked, the control unit 105 accepts that the name data has been selected as the data to be duplicated. In other words, the control unit 105 accepts that the data A shown in FIG. 5 and FIG. 7 has bee selected (S903).

The control unit 105 requests the IC card 200 for the security levels of the library APL 301 and the public pool APL 302. The security level obtaining unit 604 of the IC card 200 obtains, via the security level management unit 602, the security levels of the library APL 301 and the public pool APL 302, based on their application IDs (S904).

The security level output unit 605 outputs the obtained two security levels as a response to the request from the public service server 110 (S905).

The comparison unit 106 of the EC server 100 compares these two security level information outputted from the IC card 200. Here, the security level of the library APL 301 is "01h", while the security level of the public pool APL 302 is "03h" (See FIG. 11).

Therefore, the comparison unit 106 determines the relationship between the public pool APL 302 as a data duplication destination and the library APL 301 as a data duplication source that the security level of the former is higher than the security level of the latter (Y in S906).

The information indicating this determined relationship is transmitted to the IC card 200. The data operation unit 608 of the IC card 200 executes, based on that information, the processing of duplicating the data A stored in the memory area 331 exclusively for the library APL 301 into the memory area 332 exclusively for the public pool APL 302 (S907).

More specifically, the OS of the IC card 200 disables the firewall 340 between the application programs temporarily or partially based on the information transmitted from the public service server 110. As a result, it becomes possible for the data operation unit 608 to duplicate the data A inside the IC card 200.

Here, in the case where the security level of the application program as a duplication destination is lower than the security level of the application program as a duplication source (N in S906), the firewall 340 is not disabled temporarily or partially, and the duplication of the data A is executed via the public service server 110 (S909).

Figure 15:
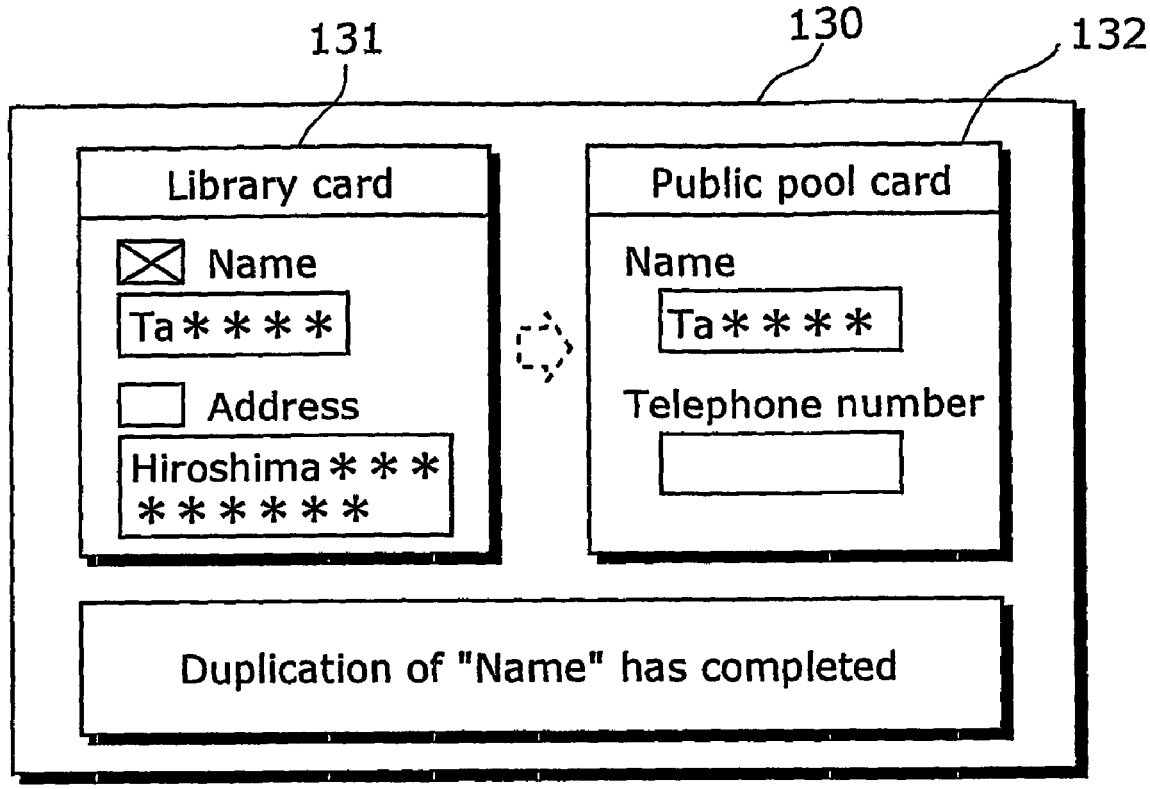
FIG. 15 is a diagram showing one example of a completion notification screen for notifying a user that duplication of data has completed.

After the duplication, a screen as shown in FIG. 15 notifying the user that the data duplication has completed is displayed on the display panel 130.

FIG. 15 is a diagram showing one example of a completion notification screen for notifying the user that duplication of data has completed. When the user wants to duplicate another data such as address data continuously following the duplication of the name data (Y in S908), he/she can mark the check box of the address on the completion notification screen shown in FIG. 15 so as to display the arrow button 135 as shown in FIG. 14 on the screen. When the user clicks the arrow button 135, the public service server 110 accepts the selection (S903) and performs the operation for duplicating the data.

The IC card 200 and the public service server 110 repeat the above operations until the data duplication is terminated (N in S908) by the user's predetermined action.

As described above, the IC card 200 in the first embodiment of the present invention identifies the security level of each application program using the security level table that is the criteria common to all the application programs.

Therefore, it becomes possible to compare the security strengths of two different application programs based on their respective security levels identified under the same criterion. The comparison unit 106 of the public service server 110 which communicates with the IC card 200 performs this comparison.

If it is determined, as a result of this comparison, that the application program as the duplication destination which requires data duplication has a security function equal to or stronger than that of the duplication source, the data is considered to be important. Therefore, the public service server 110 requests the IC card 200 to duplicate such important data inside the IC card 200 itself.

Figure 16:
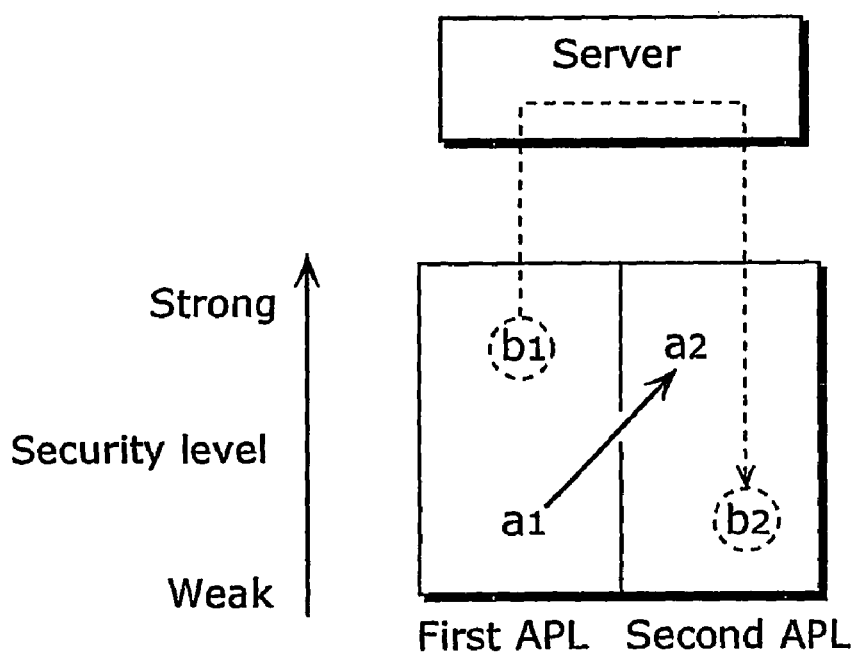
FIG. 16 is a schematic diagram showing relationship between security levels and data duplication routes in the first embodiment.

FIG. 16 is a schematic diagram showing the relationship between the security levels and data duplication routes in the first embodiment. The first APL is an application program as a duplication source, while the second APL is an application program as a duplication destination. The first APL and the second APL are stored in the IC card 200, and the memory areas exclusively for respective application programs are protected from each other by a firewall. In this diagram, a1, a2, b1 and b2 represent security levels.

For example, when the security level of the first APL is a1 and the security level of the second APL is a2, the security level of the duplication destination is higher than that of the duplication source, which means that the data to be duplicated is considered to be important. Therefore, the firewall in the IC card 200 is temporarily or partially disabled for data duplication inside the IC card.

If the security level of the first APL is b1 and the security level of the second APL is b2, the security level of the duplication destination is lower than that of the duplication source, which means that the data to be duplicated is not considered to be important. Therefore, the firewall is not disabled temporarily or partially for data duplication inside the IC card, and the data is duplicated via the server.

As mentioned above, important data is duplicated inside the IC card 200. Since the data is not taken outside of the IC card 200, there is no risk that the data is vulnerable to leakage or tampering. As a result, it becomes possible to duplicate important data from one application program to another in security.

Note that in the first embodiment, the description of the IC card 200 and the public service server 110 is given taking, as an example, the case where the IC card 200 communicates with the public service server 110. However, the IC card 200 does not always communicate with the public service server 110, and may communicate with the EC server 100 shown in FIG. 4 or any other server.

In other words, it is not limited to the public service server 110 that the IC card 200 communicates with. The IC card 200 can communicate with any server that has a function of comparing the security levels and a function of authenticating the application programs stored in the IC card 200.

As for the flowchart shown in FIG. 12, the description is given on the assumption that the duplication is executed via the public service server 110 (S909) in the case where the security level of the application program as the duplication destination is lower than the security level of the application program as the duplication source (N in S906). However, in the case where the data is duplicated via the public service server 110, it is also possible to duplicate the data with the user's consent or to prohibit the duplication.

In doing so, it also becomes possible to maintain the confidentiality of the data which is not considered to be important. In such a structure, it is still possible to duplicate important data in security from one application program to another inside the IC card 200.

Furthermore, the IC card 200 is not limited to a contact IC card, and may be a contactless IC card. Even if the IC card 200 is a contactless IC card, it is possible to duplicate important data in security without any effect on the processing such as identification of the security level that is the feature of the present invention.

The above description is made on the assumption that the data duplication route is determined based on the result of the comparison between two security levels by the comparison unit 106 of the public service server 110, but the present invention is not limited to such route determination. For example, it is also possible to store the comparison result into a predetermined storage area and then determine, using the stored comparison result, the route of data duplication to be performed following the comparison.

In doing so, there is no need to compare the security levels in every receipt of a request for data duplication from the IC card 200, which allows reduction of processing time.

Figure 1:
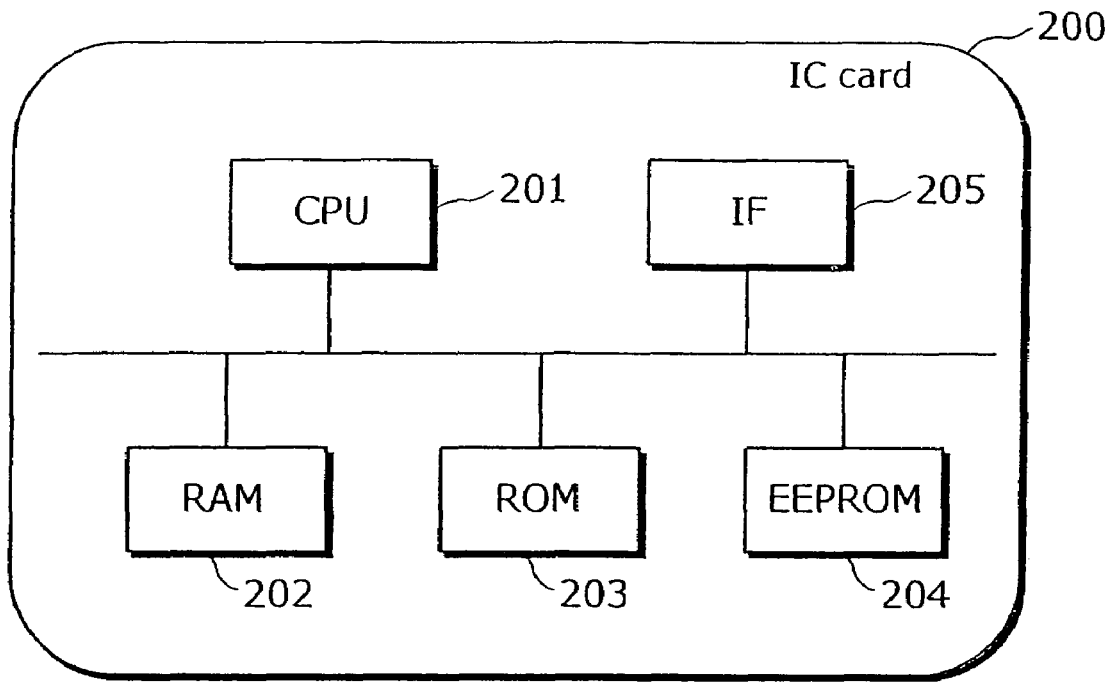
FIG. 1 is a diagram showing an overview of an internal structure of a commonly-used IC card.
Figure 2:
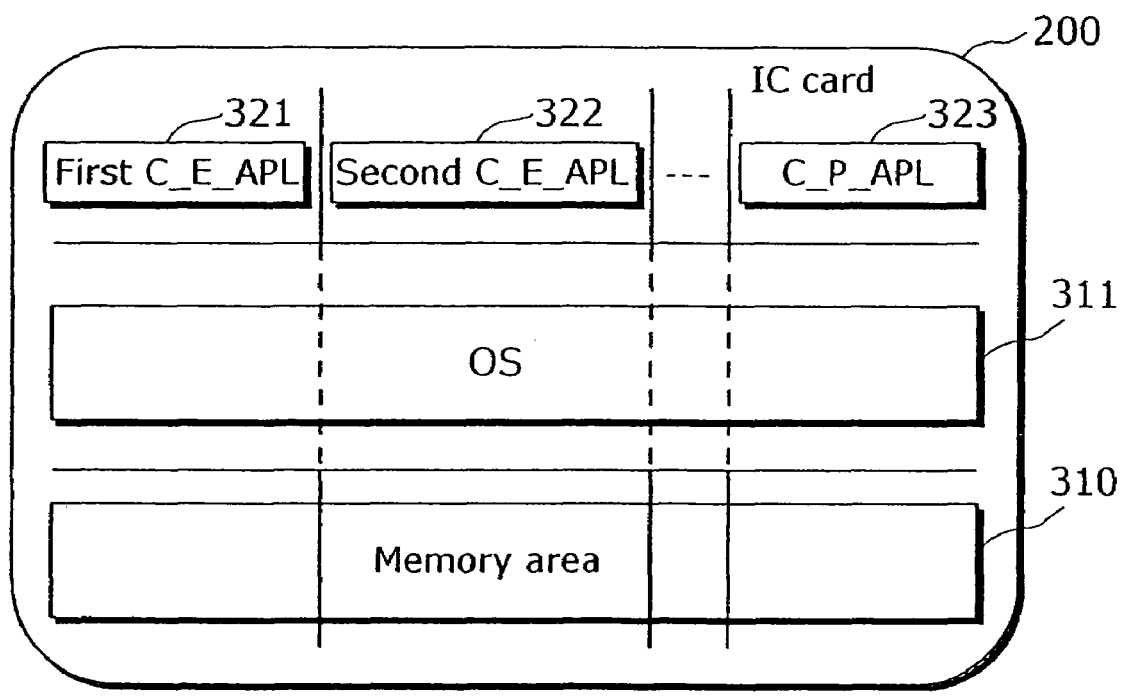
FIG. 2 is a diagram showing a software structure of an IC card.
Figure 3:
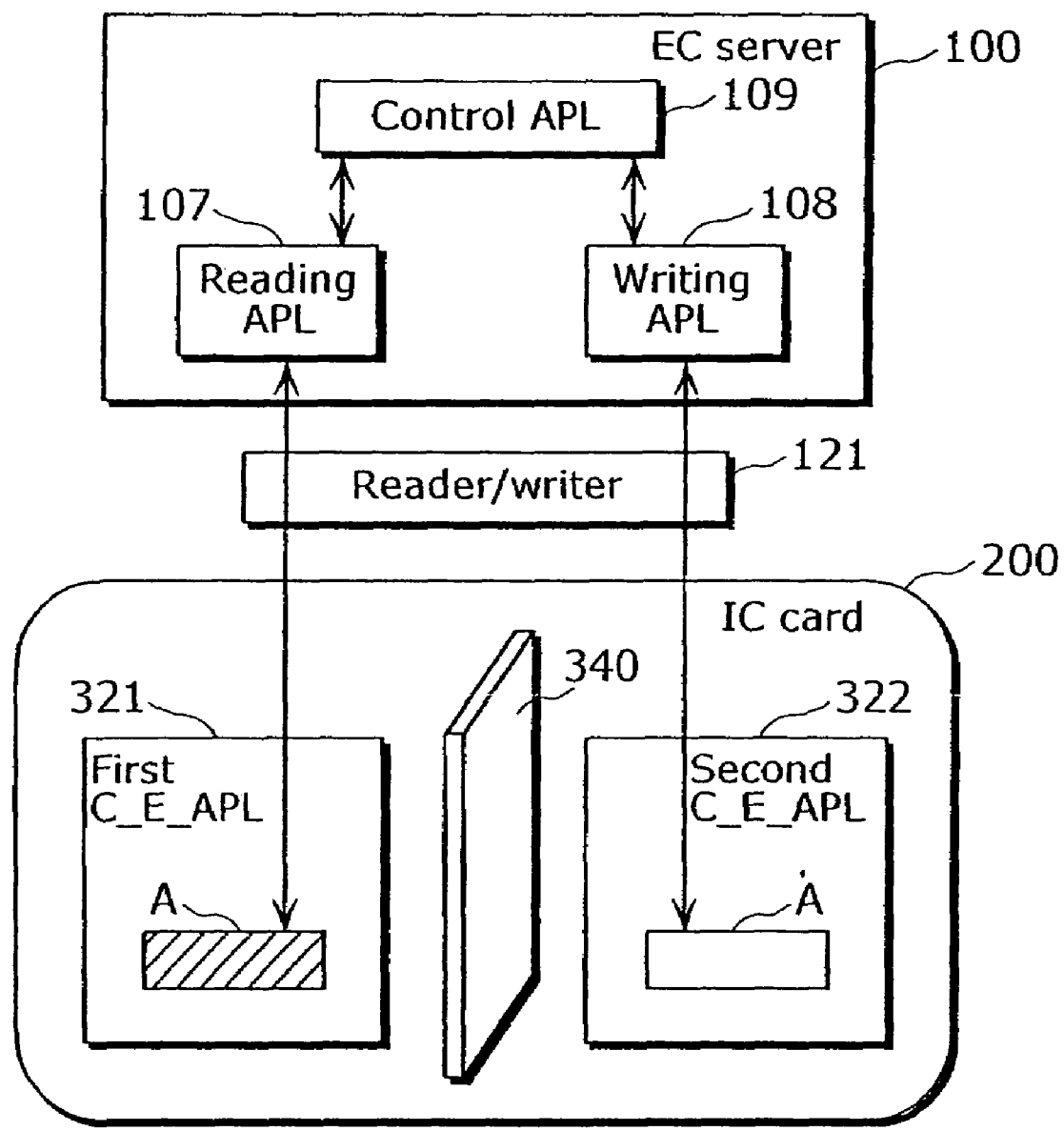
FIG. 3 is a conceptual diagram showing how data is duplicated from one application program to another in a conventional IC card.

The above description is made on the assumption that the hardware structure of the IC card 200 is same as the hardware structure of a commonly-used IC card as shown in FIG. 1. However, it may be another hardware structure, and for example, the EEPROM 204 may be replaced with FeRAM, or any other non-volatile memory.

Furthermore, the security level management unit 602, the security level obtaining unit 604, the security level output unit 605 and the data operation unit 608 included in the IC card 200 are embodied as computer programs. Some of the programs are stored in the ROM 203 and executed, and others are downloaded from outside, stored in the EEPROM 204 that is a non-volatile memory and then executed. The library APL 301 and the public pool APL 302 are stored in the ROM 203 or the EEPROM 204. The security information storage unit 610 and the memory area 310 are embodied as separate areas in the EEPROM 204.

Some functional blocks of the IC card 200 shown in FIG. 7 can be embodied as an LSI that is a type of an integrated circuit in combination with hardware resources such as CPU, RAM, ROM and non-volatile memories. These blocks can be integrated separately, or a part or all of them can be integrated into a single chip.

Figure 17:
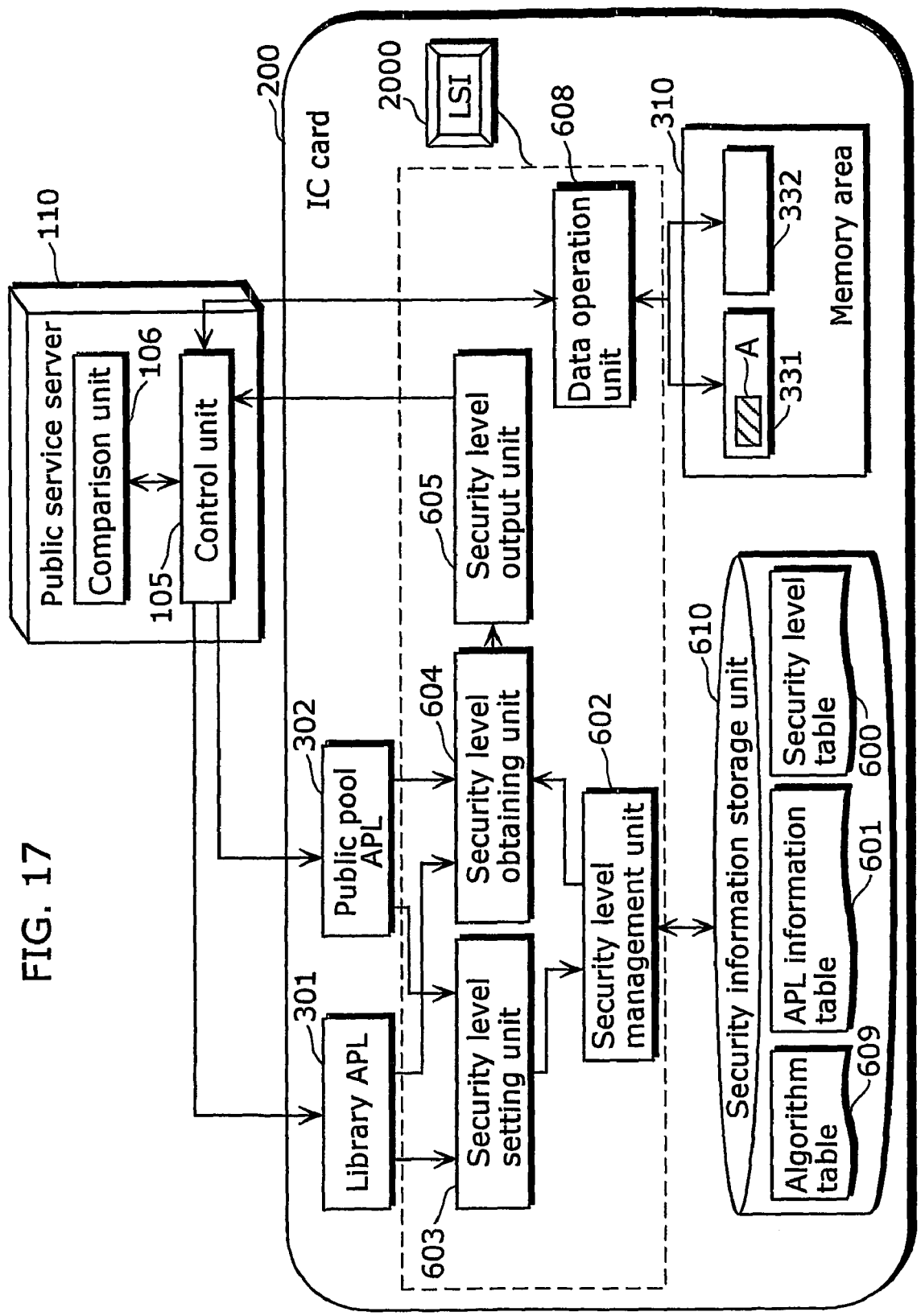
FIG. 17 is a diagram showing one example in which a part of the constituent elements of the IC card in the first embodiment is implemented as an integrated circuit.

FIG. 17 is a diagram showing one example in which the functional blocks of the IC card 200 in the first embodiment is implemented in integrated circuit form. An LSI 2000 is one example of an integrated circuit, and a range enclosed with a dotted line is one example of a range of functional blocks to be implemented as an integrated circuit. The LSI here can be called an IC, a system LSI, a super LSI or an ultra LSI depending on their degrees of integration.

An integrated circuit used for such an embodiment is not limited to an LSI, and it may be embodied as a dedicated circuit or a general-purpose processor. It is also possible to use a field programmable gate array (FPGA) which can be programmed in the field after manufacturing an LSI, or a reconfigurable processor in which connection and setting of circuit cells inside an LSI can reconfigured.

Furthermore, if a new technology for integrated circuits appears and replaces LSIs with the progress of semiconductor technologies or other technologies derived from such semiconductor technologies, it is, of course, possible to use the new technology to implement the functional blocks in the form of integrated circuits. For example, biotechnology can be applied to the implementation of the functional blocks in the form of integrated circuits.

Second Embodiment

In the above first embodiment, the comparison unit 106 of the public service server that is a communication partner of the IC card 200 compares the security levels. However, the present invention is not limited to such a configuration, and it can also be assumed that the security levels are compared inside the IC card 200.

So, in the second embodiment, a description is given of a configuration in which the comparison unit 606 included inside the IC card 200 compares the security levels.

Note that in the second embodiment, the environment in which the IC card 200 is used is same as the environment shown in FIG. 4, to which the description of the first embodiment refers. In addition, it is assumed that the communication partner of the IC card 200 is the public service server 110, as is the case with the first embodiment, and the overview of the hardware configuration in such environment is same as that shown in FIG. 5.

Figure 18:
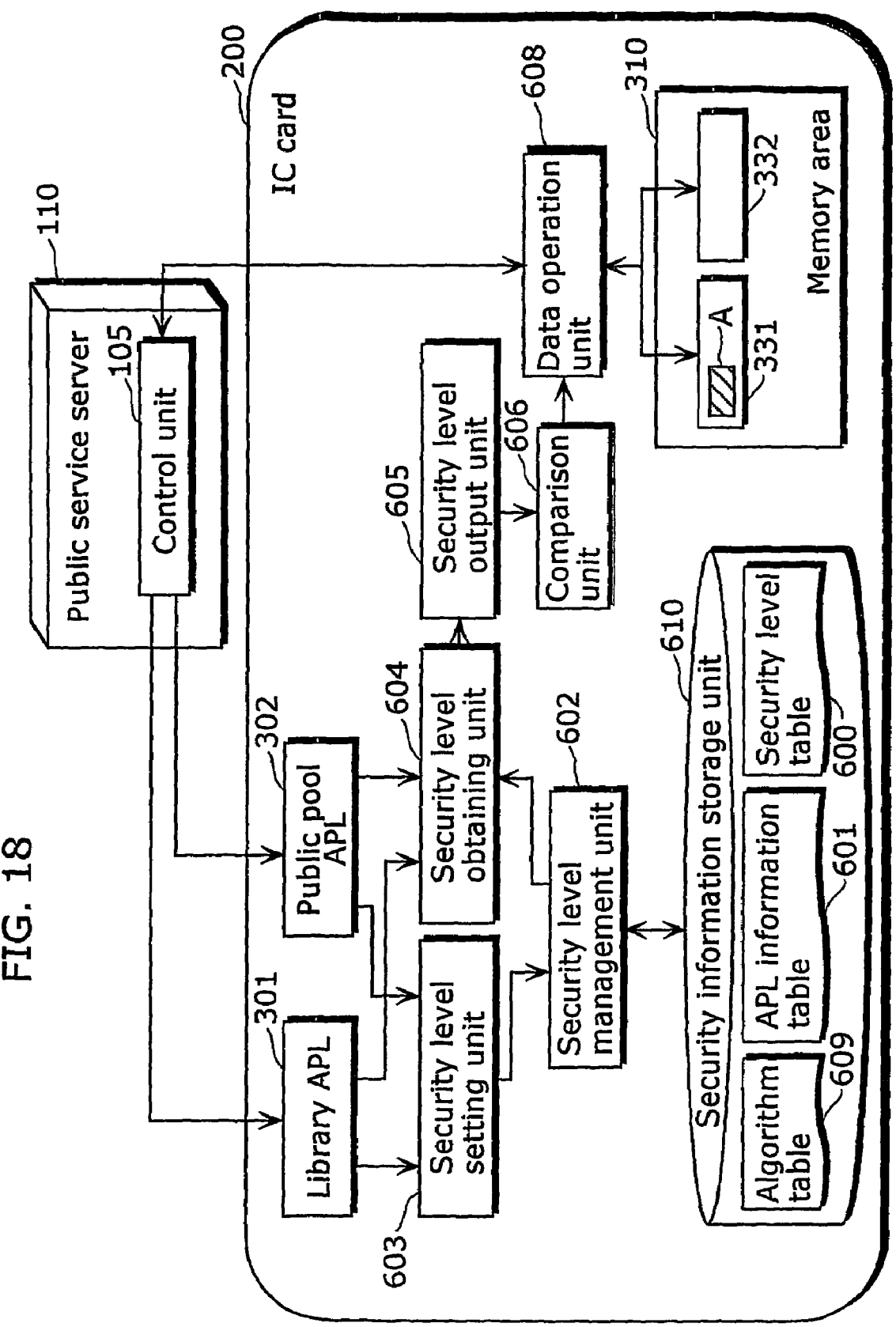
FIG. 18 is a functional block diagram showing functional software structures of an IC card and a public service server in a second embodiment.

First, a description is given of the structures of the IC card 200 and the public service server 110 in the second embodiment, with reference to FIG. 18.

FIG. 18 is a functional block diagram showing the functional software structures of the IC card 200 and the public service server 110 in the second embodiment.

As shown in FIG. 18, the IC card 200 in the second embodiment has a structure in which the comparison unit 606 is added to the structure of the IC card 200 in the first embodiment shown in FIG. 7. The public service server 110 in the second embodiment has a structure in which the comparison unit 106 is deleted from the structure of the public service server 110 in the first embodiment shown in FIG. 7.

Note that the data operation unit 608 in the IC card 200 in the second embodiment is one example of a processing unit for embodying the following two functions of the duplication unit and the obtaining unit respectively in the semiconductor memory of the present invention: a function of duplicating data; and a function of obtaining the relationship between two security levels.

The comparison unit 606 is a processing unit for comparing two security levels transmitted from the security level output unit 605 and determining the relationship between the two security levels.

Each constituent element except for the comparison unit 606 of the IC card 200 and the public service server 110 in the second embodiment performs the same processing as the elements of the IC card 200 and the public service server 110 in the first embodiment.

However, the security levels are transmitted from the security level output unit 605 of the IC card 200 to the public service server 110 in the first embodiment, while they are transmitted from the security level output unit 605 of the IC card 200 to the comparison unit 606 of the IC card 200 in the second embodiment.

The comparison unit 606 in the IC card 200 receives the security level of the library APL 301 and the security level of the public pool APL 302 outputted from the security level output unit 605, compares these two security levels, and determines the relationship between them.

Figure 19:
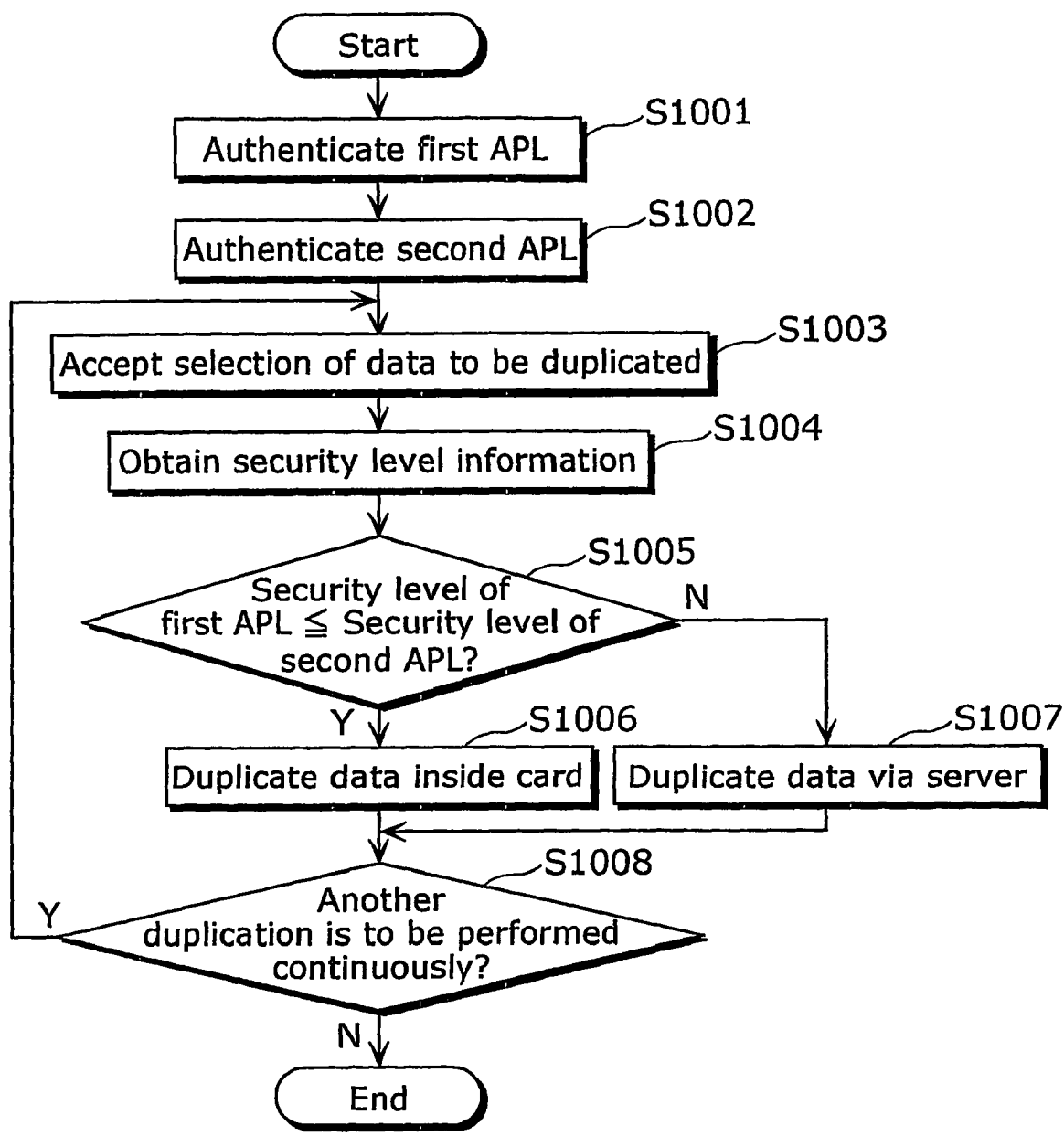
FIG. 19 is a flowchart showing a flow of data duplication operations of the IC card and the public service server in the second embodiment.

Next, a description is given below of the operations of the IC card 200 and the public service server 110 in the second embodiment, with reference to FIG. 19. FIG. 19 is a flowchart showing the flow of data duplication operations of the IC card 200 and the public service server 110 in the second embodiment.

Note that the following description is made of the case where the data A that is the data of the library APL 301 is duplicated into the memory area 332 exclusively for the public pool APL 302, and focuses on the operations different from those in the first embodiment.

First, the control unit 105 of the public service server 110 authenticates the library APL 301 that is the first application program having the data A and the public pool APL 302 that is the second application program into which the data A is to be duplicated (S1001 and S1002).

After the authentication, the control unit 105 accepts the selection of the data A as data to be duplicated (S1003).

The above-mentioned operations are same as the operations of the IC card 200 and the public service server 110 in the first embodiment, but the following operations are different from those in the first embodiment.

When the control unit 105 of the public service server 110 accepts that the data A is the data to be duplicated, it requests the IC card 200 to compare the security levels of the library APL 301 and the public pool APL 302.

Upon receipt of the above request, the security level obtaining unit 604 of the IC card 200 obtains the security levels of the library APL 301 and the public pool APL 302 based on their application IDs via the security level management unit 602 (S1004).

The security level output unit 605 receives these two security levels from the security level obtaining unit 604, and outputs them to the comparison unit 606.

The comparison unit 606 compares the two security level information outputted from the security level output unit 605. Here, the security level of the library APL 301 is "01h", while the security level of the public pool APL 302 is "03h" (See FIG. 11).

In other words, the comparison unit 606 determines the relationship between the security levels of the public pool APL 302 as a data duplication destination and the library APL 301 as a data duplication source that the security level of the former is higher than that of the latter (Y in S1005).

Based on this determined relationship, the OS of the IC card 200 temporarily or partially disables the firewall 340 in order to duplicate the data A. The data operation unit 608 performs the processing of duplicating the data A stored in the memory area 331 exclusively for the library APL 301 into the memory area 332 exclusively for the public pool APL 302 (S1006).

Note that in the case where the security level of the application program as a duplication destination is lower than the security level of the application program as a duplication source (N in S1005), the firewall 340 is not disabled temporarily or partially and the duplication is performed via the public service server 110 (S1007), as is the case with the first embodiment.

In the case where another data is duplicated following the duplication of the data A (Y in S1008), the processing flow goes back to the acceptance of the selection (S1003).

The IC card 200 and the public service server 110 repeat the above operations until the data duplication is terminated by the user's predetermined action (N in S1008).

As described above, the flow of operations of the IC card 200 and the public service server 110 in the second embodiment is basically same as that in the first embodiment. However, in the second embodiment, the inclusion of the comparison unit 606 in the IC card 200 allows comparison of two security levels without taking these security levels outside of the IC card 200 (S1005). In other words, it is possible to compare the security levels without reading them outside of the IC card 200, that is, not through an external device connected to the IC card 200.

In other words, not only the important data but also the security levels of the application programs are not taken outside of the IC card 200, so the information stored in the IC card 200 can be protected in more security.

Note that the security strengths of the application programs are compared using their security levels identified based on the encryption algorithms not only in the first embodiment but also in the second embodiment. However, the security levels identified based on the information other than the encryption algorithms may be used for such comparison.

More specifically, in the first embodiment, the security strength of each application program is determined to be a value of a security level corresponding to one of "strong", "medium", "weak" and "none" based on the encryption algorithm used for the application program. However, it is also possible to use, as a security level, a bit length of an encryption key, encryption key data or the like, which is one of the conditions for encrypting the data of each application program.

In other words, in the second embodiment, not only the data to be duplicated but also the security levels of the application programs are not taken outside of the IC card 200, so there is no risk of leakage of them even if the encryption conditions are used as security levels. Therefore, it becomes possible to compare the security strengths of different application programs using the security levels identified by the above encryption conditions.

Furthermore, it is also possible to compare the security strengths of different application programs using two different scales, namely, the four security levels "strong", "medium", "weak" and "none" used in the first embodiment, and the encryption conditions used in the second embodiment.

For example, in the case where the security levels of two application programs are same in terms of the above four levels, it is possible to determine that the security strength of the application program with a longer bit length of its encryption key is stronger.

In doing so, the security levels can be compared on a finer scale in the second embodiment, while they are compared just according to the four levels in the first embodiment.

The security level management unit 602, the security level obtaining unit 604, the security level output unit 605, the comparison unit 606 and the data operation unit 608 included in the IC card 200 in the second embodiment are embodied as computer programs. Some of these programs are stored in a ROM in the IC card and executed, others are downloaded from outside, stored in a non-volatile memory and then executed. The library APL 301 and the public pool APL 302 are stored in the ROM 203 or the EEPROM 204. The security information storage unit 610 and the memory area 310 are respectively embodied as separate areas in the EEPROM 204.

The functional blocks in the IC card 200 shown in FIG. 18 can be embodied as an LSI that is a type of an integrated circuit in combination with hardware resources such as CPU, RAM, ROM and other non-volatile memories. These blocks can be integrated separately, or a part or all of them can be integrated into a single chip.

Figure 20:
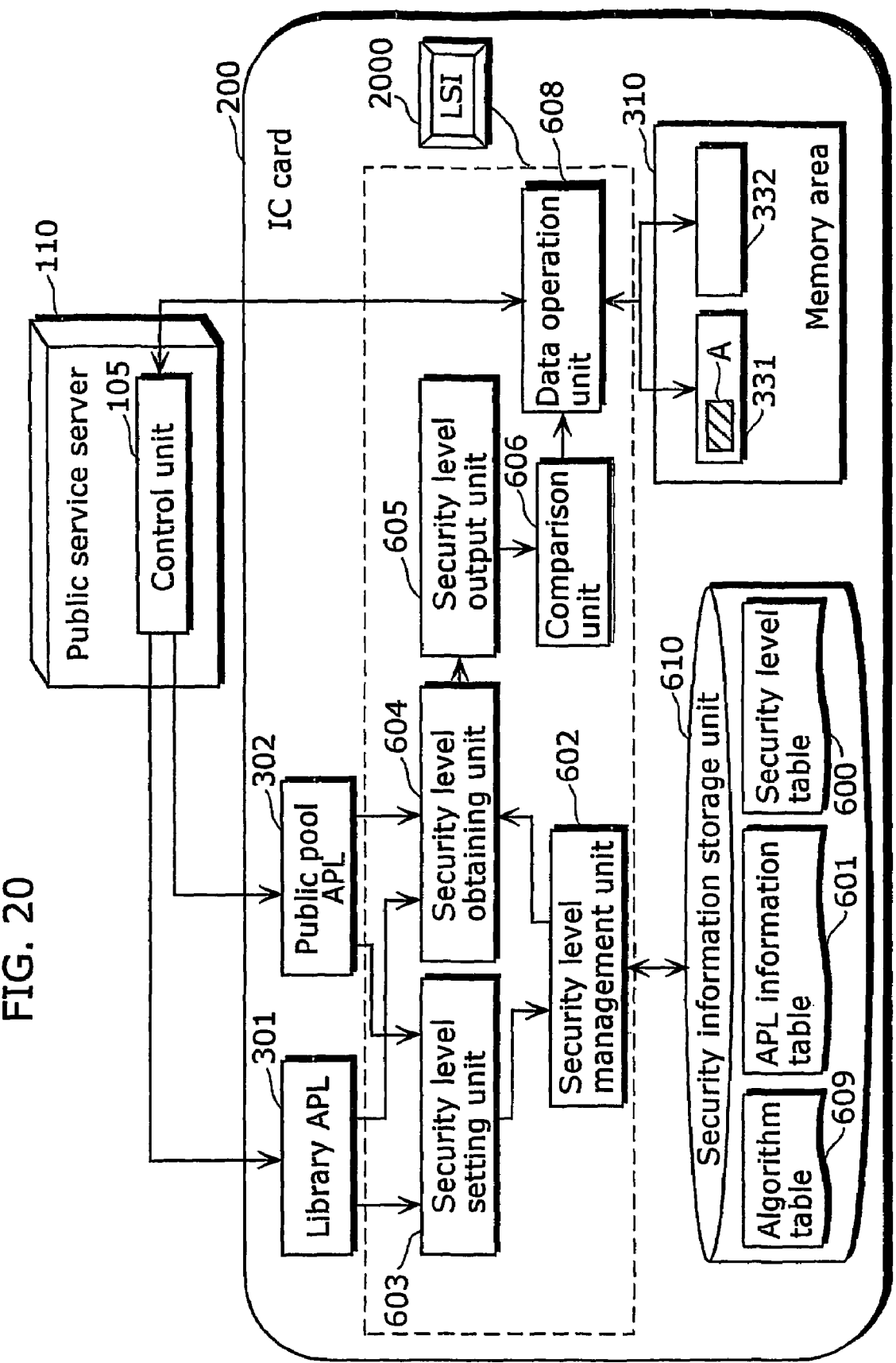
FIG. 20 is a diagram showing one example in which a part of the constituent elements of the IC card in the second embodiment is implemented as an integrated circuit.

FIG. 20 is a diagram showing one example in which a part of the IC card 200 in the second embodiment is implemented in integrated circuit form. The LSI 2000 is one example of an integrated circuit, and a range enclosed with a dotted line is one example of a range of functional blocks to be implemented into an integrated circuit. The LSI here can be called an IC, a system LSI, a super LSI or an ultra LSI depending on their degrees of integration.

An integrated circuit used for such an embodiment is not limited to an LSI, and it may be embodied as a dedicated circuit or a general-purpose processor. It is also possible to use a field programmable gate array (FPGA) which can be programmed in the field after manufacturing an LSI, or a reconfigurable processor in which connection and setting of circuit cells inside an LSI can reconfigured.

Furthermore, if a new technology for integrated circuits appears and replaces implementation of LSI with the progress of semiconductor technologies or other technologies derived from such semiconductor technologies, it is, of course, possible to use the new technology to implement the functional blocks in the form of integrated circuits. For example, biotechnology can be applied to the implementation of the functional blocks in the form of integrated circuits.

Third Embodiment

In the second embodiment, the comparison unit 606 in the IC card 200 compares the security levels. Therefore, the description shows that the encryption conditions can be used as the information for identifying the security levels because the security levels are not taken outside of the IC card 200.

However, the information for identifying the security levels can be the information other than the encryption algorithms shown in the first embodiment and the encryption conditions shown in the second embodiment. For example, a protocol version that is a version of an application protocol can be used.

So, a description is given, as the third embodiment, of the use of such a protocol version as a security level.

Conventionally, data is sent and received between an IC card and an external device using application protocol data unit.(APDU) commands defined in the ISO7816 that is the international standard for contact-type IC cards. In the above first and second embodiments, data is sent and received, using the APDU commands, between the IC card 200 and the EC server100, the public service server 110 or the reader/writer 121.

There are the following types of APDU commands: a command APDU used for transmitting data from a host device to an IC card; and a response APDU used for transmitting data from an IC card to a host device.

So, in the third embodiment, a description is given of the case where an APDU command containing version numbers of application protocols is transmitted to the public service server 110. In other words, the following description is made on the assumption that the protocol versions are used as the security levels in the IC card 200 and the public service server 110 of the first embodiment.

FIG. 21 is a diagram showing a data structure of a command APDU. As shown in FIG. 21, a command APDU has a mandatory header and a body to follow the header conditionally. The mandatory header includes control parameters P1 and P2 of 1 byte each.

The public service server 110 can transmit the command APDU containing, in the data area of these control parameters (P1 and P2), a request for creating a response APDU containing the version numbers of the application protocols, for example.

In general, a version number of an application protocol is incremented as its function is enhanced. For example, in the case where the security function is enhanced or improved, the version number is incremented. In other words, it can be said that the security level of the application protocol with a larger version number is higher as a result of the comparison of the version numbers of application protocols.

As shown in FIG. 11, the version number of the application protocol of each application program is stored in the APL information table 601. Therefore, the IC card 200 can create the response APDU containing the version numbers of the application protocols of the library APL 301 and the public pool APL 302 and transmit it to the public service server 110, for example. As a result, the comparison unit 106 (See FIG. 7) of the public service server 110 can compare the version numbers.

A description is given below, with reference to FIGS. 22 to 24, a method for transmitting version numbers of application protocols using a response APDU.

FIG. 22 is a diagram showing an example of commands which are defined in the ISO7816 that is the international standard for contact-type IC cards. FIG. 23 is a diagram showing contents of a control parameter P1 in a SELECT command.

For example, in the case of a SELECT command, there are unspecified values in P1, as shown in FIG. 23. It is possible to make a request to the IC card 200 using one of these unspecified values.

For example, the public service server 110 transmits a SELECT command having a value "1" of b8 (values of other bits than b8 are any of the values indicated in FIG. 23) to the IC card 200. In doing so, it becomes possible to request the IC card 200 to create a response APDU containing the version numbers of the application protocols.

Figures 24, 25:
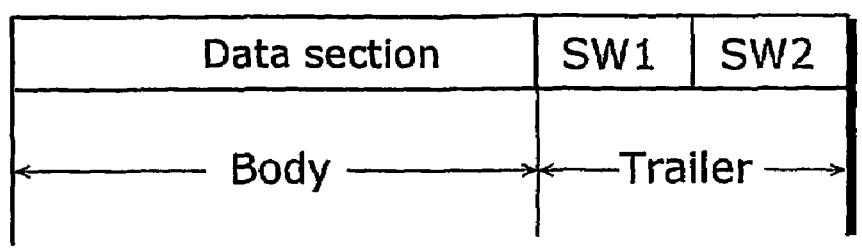
FIG. 24 is a diagram showing a data structure of a response APDU.
FIG. 25 is a diagram showing contents of a class byte (CLA) in a command APDU.

When the IC card 200 receives the SELECT command, it can create the response APDU containing, in its data section shown in FIG. 24, the version numbers of the application protocols and transmit it.

The SELECT command is described here as an example, but the present invention is not limited to it. It is possible to request the IC card 200 to create a response APDU containing the version numbers of application protocols if a command APDU has unused bits.

Furthermore, it is also possible for the public service server 110 to create its own command APDU for causing the IC card 200 to transmit the version numbers of application protocols.

FIG. 25 is a diagram showing contents of a class byte (CLA) in a command APDU. As shown in FIG. 25, if b5 to b8 in CLA are 0, it means that the command APDU is a common command which is compliant with ISO7816-4. If b8 in CLA is 1, it means that the command APDU is a unique command of the public service server 110. In other words, by setting b8 in CLA to be 1, it becomes possible to create a unique command APDU for requesting the IC card 200 to create a response APDU containing the version numbers of application protocols and transmit it.

As described above, it is possible for the IC card 200 to create a response APDU containing the version numbers of application protocols and transmit it to the public service server 110. It is possible for the public service server 110 to compare these two version numbers so as to determine the relationship between the security levels of the two application programs.

For example, it is assumed that the data of the library APL 301 is duplicated into the public pool APL 302. Since the version number of the library APL 301 is 01h, while the version number of the public pool APL302 is 05h (See FIG. 11), it is determined that the security level of the public pool APL 302 is higher.

The IC card 200 obtains, from the public service server 110, the information indicating that the security level of the public pool APL 302 is higher and duplicates the data in itself. As a result, such important data is duplicated inside the IC card 200.

As described above, even if the version numbers of application protocols are used as security levels, it is possible to duplicate important data in security, as is the case with the first and second embodiments.

Note that in the case where the protocol version of a duplication destination is older than that of a duplication source, namely, the version number of the former is smaller than that of the latter, it is possible to judge that the security of communication between them may go down, and thus disable the data duplication. In doing so, it becomes possible to further reduce the risk of data leakage.

It is not always necessary to use the version number itself of an application protocol as a security level, and any value identified by the version number may be used.

The version number of not only an application protocol but also an application program is incremented. For example, when the security function is enhanced or improved, the version number of the application program is incremented. Therefore, the version number of the application program itself, not the protocol version, may be used as a security level.

In this case, it is possible to transmit the APDU command containing the version numbers of the application programs in the same manner as the protocol versions. Or in order to compare the security strengths of different application programs based on their version numbers, it is also possible to convert the version numbers into the values indicating their security strengths based on the criterion common to all the application programs, and then transmit those values. In other words, any values identified by the version numbers of application programs can be used as security levels.

In the third embodiment, the comparison unit 106 of the public service server 110 compares the version numbers of application protocols or application programs. However, the comparison of the version numbers may be performed inside the IC card 200.

For example, in the second embodiment, it is possible for the comparison unit 606 in the IC card 200 to compare the version numbers of application protocols using those version numbers as security levels.

Regardless of whether the comparison of version numbers are performed inside the IC card 200 or outside the IC card 200, it is also possible to identify the security levels of application programs based on a combination of the version numbers and another criterion, such as information of encryption algorithms used in the first embodiment and encryption conditions described in the second embodiment, and to compare their security strengths using such identified security levels.

In doing so, it becomes possible to adopt the optimum method for comparison of the security strengths of application programs, for example.

In the above first to third embodiments, it is determined whether data is duplicated inside the IC card 200 or not by comparing the attribute information of application programs such as their encryption algorithms and protocol versions. However, it can be determined whether data is duplicated inside the IC card 200 or not by another method.

For example, in the case where separate non-volatile memories respectively have a memory area in which data to be duplicated is stored and a memory area in which the data is to be duplicated, it may be determined whether the data is duplicated inside the IC card 200 or not based on the security strengths of these two non-volatile memories.

Figure 26A:
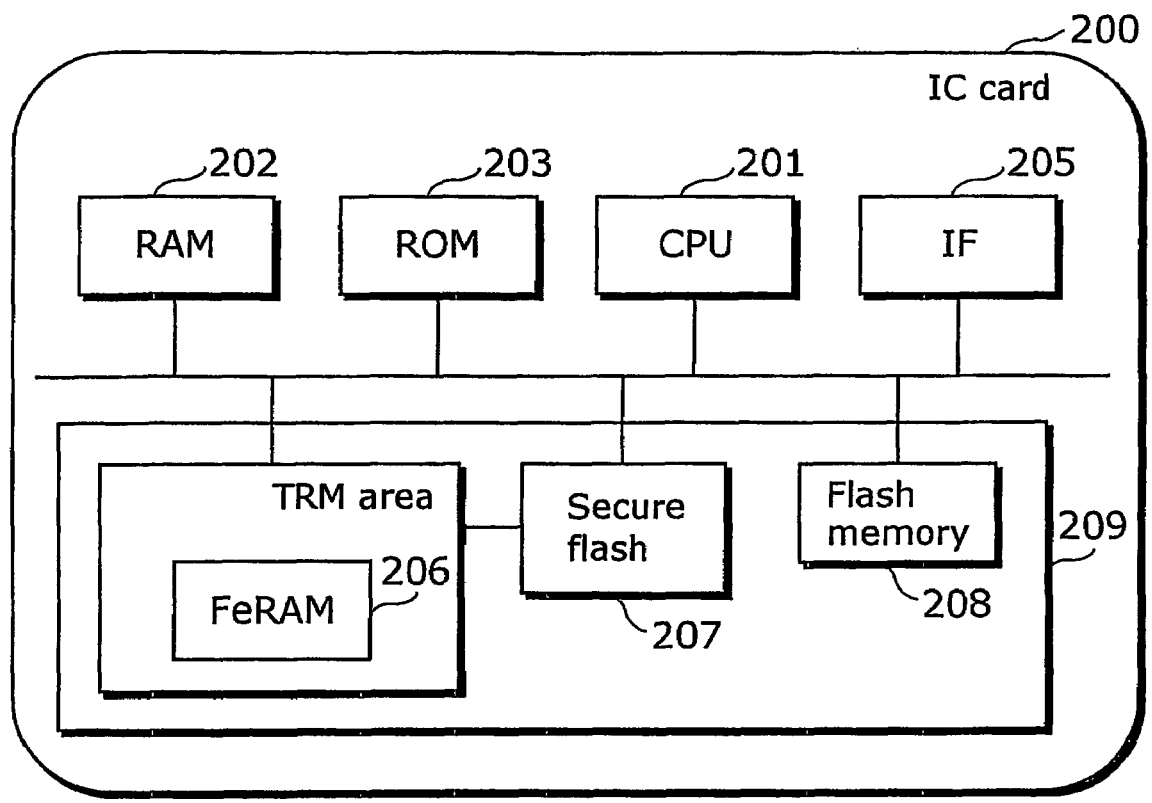
FIG. 26A is a diagram showing one example of a hardware structure of an IC card that includes three non-volatile memories.

FIG. 26A is a diagram showing one example of a hardware structure of the IC card 200 that includes three non-volatile memories. As shown in FIG. 26A, the IC card 200 includes a group of non-volatile memories 209. The group of non-volatile memories 209 includes an FeRAM 206 in the TRM area, a secure flash 207, and a flash memory 208 outside the TRM area. Note that a secure flash denotes a flash memory with its security strength enhanced using the function of TRM.

Figure 26B:
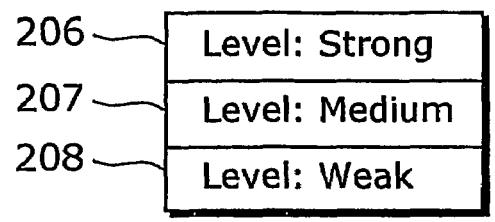
FIG. 26B is a diagram showing security strengths of the three non-volatile memories.

FIG. 26B is a diagram showing the security strengths of the three non-volatile memories. As shown in FIG. 26B, the security strength of the FeRAM 206 inside the TRM area is strongest, that of the secure flash 207 is next strongest, and that of the flash memory 208 is weakest.

For example, it is assumed that data to be duplicated exists in the secure flash 207 and it is to be duplicated into the FeRAM 206 inside the TRM area. In this case, it is deemed that the security strength of the duplication destination memory is stronger and the data to be duplicated is important one. Therefore, the data is duplicated inside the IC card 200, and thus such important data can be duplicated in security. Note that the security strength can be compared either inside or outside the IC card.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The semiconductor memory of the present invention can store two or more application programs and duplicate data from one application program to another in itself. Therefore, it is useful as an SD memory card, an IC card or the like which requires strong security function for important data.

The invention claimed is:

1. A semiconductor memory for executing at least two application programs, comprising:
    a first storage unit operable to store data relating to a first application program;
    a second storage unit operable to store data relating to a second application program;
    a level identification unit operable to identify respective security levels of the first and second application programs for the data relating to the first and second application programs, based on a criterion for identifying a security level of an application program for data relating to the application program; and
    a duplication unit operable to duplicate the data stored in the first storage unit and to store the duplicated data into the second storage unit, without taking the data outside of the semiconductor memory, in the case where a relationship between the two security levels identified by the level identification unit meets a predetermined condition.

2. A semiconductor memory according to claim 1, further comprising
    a comparison unit operable to determine the relationship by comparing the two security levels identified by the level identification unit,
    wherein the duplication unit is operable to duplicate the data stored in the first storage unit and to store the duplicated data into the second storage unit, in the case where the relationship determined by the comparison unit meets the predetermined condition.

3. A semiconductor memory according to claim 1, further comprising
    an obtaining unit operable to obtain the relationship determined by comparing the two security levels identified by the level identification unit,
    wherein the duplication unit is operable to duplicate the data stored in the first storage unit and to store the duplicated data into the second storage unit, in the case where the relationship obtained by the obtaining unit meets the predetermined condition.

4. A semiconductor memory according to claim 1, wherein the security level is a value corresponding to a strength of encryption used by each of the application programs.

5. A semiconductor memory according to claim 4, wherein the strength of the encryption is stronger as an algorithm of the encryption is more complex.

6. A semiconductor memory according to claim 4, wherein the strength of the encryption is stronger as a bit length of a key for the encryption is longer.

7. A semiconductor memory according to claim 1, wherein the security level is a value corresponding to a version number of an application protocol used by each of the application programs.

8. A semiconductor memory according to claim 1, wherein the security level is a value corresponding to a version number of each of the application programs.

9. A data duplication method used for a semiconductor memory for executing at least two application programs, wherein the semiconductor memory includes:
    a first storage unit operable to store data relating to a first application program; and
    a second storage unit operable to store data relating to a second application program, and the data duplication method comprises:
    identifying respective security levels of the first and second application programs for the data relating to the first and second application programs, based on a criterion for identifying a security level of an application program for data relating to the application program; and
    duplicating the data stored in the first storage unit and storing the duplicated data into the second storage unit, without taking the data outside of the semiconductor memory, in the case where a relationship between the identified two security levels meets a predetermined condition.

10. A program used for data duplication in a semiconductor memory for executing at least two application programs,
wherein the semiconductor memory includes:
a first storage unit operable to store data relating to a first application program; and
a second storage unit operable to store data relating to a second application program, and the program causes a computer to execute:
identifying respective security levels of the first and second application programs for the data relating to the first and second application programs, based on a criterion for identifying a security level of an application program for data relating to the application program; and
duplicating the data stored in the first storage unit and storing the duplicated data into the second storage unit, without taking the data outside of the semiconductor memory, in the case where a relationship between the identified two security levels meets a predetermined condition.

11. A computer-readable recording medium on which a program used for data duplication in a semiconductor memory is stored, the semiconductor memory for executing at least two application programs,
wherein the semiconductor memory includes:
a first storage unit operable to store data relating to a first application program; and
a second storage unit operable to store data relating to a second application program, and the program causes a computer to execute:
identifying respective security levels of the first and second application programs for the data relating to the first and second application programs, based on a criterion for identifying a security level of an application program for data relating to the application program; and
duplicating the data stored in the first storage unit and storing the duplicated data into the second storage unit, without taking the data outside of the semiconductor memory, in the case where a relationship between the identified two security levels meets a predetermined condition.

12. An integrated circuit for controlling data duplication in a semiconductor memory for executing at least two application programs,
wherein the semiconductor memory includes:
a first storage unit operable to store data relating to a first application program; and
a second storage unit operable to store data relating to a second application program, and the integrated circuit comprises:
a level identification unit operable to identify respective security levels of the first and second application programs for the data relating to the first and second application programs, based on a criterion for identifying a security level of an application program for data relating to the application program; and
a duplication unit operable to duplicate the data stored in the first storage unit and to store the duplicated data into the second storage unit, without taking the data outside of the semiconductor memory, in the case where a relationship between the two security levels identified by the level identification unit meets a predetermined condition.

* * * * *